US012764531B2

(12) United States Patent
Wu et al.

(10) Patent No.: US 12,764,531 B2
(45) Date of Patent: Oct. 13, 2026

(54) METHOD, SYSTEM, AND APPARATUS FOR GENERATING KEY FOR INTER-DEVICE COMMUNICATION

(71) Applicant: Huawei Technologies Co., Ltd., Shenzhen (CN)

(72) Inventors: Yizhuang Wu, Beijing (CN); Ao Lei, Beijing (CN); Taoran Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 18/349,587

(22) Filed: Jul. 10, 2023

(65) Prior Publication Data

US 2023/0354028 A1 Nov. 2, 2023

Related U.S. Application Data

(63) Continuation of application No. PCT/CN2021/071149, filed on Jan. 11, 2021.

(51) Int. Cl.
*H04W 12/069* (2021.01)
*H04W 12/04* (2021.01)

(52) U.S. Cl.
CPC ......... *H04W 12/069* (2021.01); *H04W 12/04* (2013.01)

(58) Field of Classification Search
CPC ... H04W 12/04; H04W 12/06; H04W 12/069; H04W 88/04
See application file for complete search history.

(56) References Cited

U.S. PATENT DOCUMENTS

| | | | | |
|---|---|---|---|---|
| 10,383,161 | B2 * | 8/2019 | Schmidt | H04W 76/14 |
| 11,337,271 | B2 * | 5/2022 | Sharma | H04W 36/0033 |
| 12,401,998 | B2 * | 8/2025 | Rohini | H04W 76/14 |
| 2011/0305339 | A1 * | 12/2011 | Norrman | H04W 12/50 380/270 |
| 2017/0055149 | A1 * | 2/2017 | Lehtovirta | H04W 12/0431 |
| 2018/0020442 | A1 * | 1/2018 | Nair | H04W 12/04 |
| 2018/0270653 | A1 * | 9/2018 | Wifvesson | H04W 48/16 |
| 2019/0261309 | A1 * | 8/2019 | Martin | H04W 76/14 |

(Continued)

FOREIGN PATENT DOCUMENTS

CN 111866871 A 10/2020

OTHER PUBLICATIONS

Huawei et al., "Solution on key management in UE-to-network relay based on primary authentication S3-203432", 3GPP TSG SA WG3 Meeting #101e, Nov. 20, 2020, total 3 pages.

(Continued)

*Primary Examiner* — Yuwen Pan
*Assistant Examiner* — Samuel H. Leonard
(74) *Attorney, Agent, or Firm* — Slater Matsil, LLP

(57) ABSTRACT

First user equipment generates a first temporary identifier based on a first key; the first user equipment sends a first request to second user equipment, where the first request is used to establish a communication connection between the first user equipment and the second user equipment, and the first request includes the first temporary identifier and a relay service code; and the first user equipment generates a shared key based on a second key and the relay service code, where (Continued)

the shared key is used to protect the communication connection between the first user equipment and the second user equipment.

20 Claims, 18 Drawing Sheets

(56) References Cited

U.S. PATENT DOCUMENTS

| | | | | |
|---|---|---|---|---|
| 2021/0127343 | A1* | 4/2021 | Mladin | H04W 76/14 |
| 2021/0345104 | A1* | 11/2021 | Cheng | H04W 12/0433 |
| 2022/0109996 | A1* | 4/2022 | Lee | H04W 12/50 |
| 2022/0338000 | A1* | 10/2022 | Lee | H04W 12/71 |
| 2022/0377546 | A1* | 11/2022 | Mazinani | H04W 12/10 |
| 2023/0007709 | A1* | 1/2023 | Paladugu | H04W 76/14 |
| 2023/0011576 | A1* | 1/2023 | Bilgin | H04W 12/0433 |
| 2023/0023639 | A1* | 1/2023 | Shi | H04W 8/005 |
| 2023/0262453 | A1* | 8/2023 | Baskaran | H04W 12/041 726/1 |
| 2023/0269582 | A1* | 8/2023 | Castellanos Zamora | H04L 65/1016 455/410 |
| 2023/0362637 | A1* | 11/2023 | Thiebaut | H04L 63/0884 |
| 2023/0370839 | A1* | 11/2023 | Wifvesson | H04W 12/041 |
| 2023/0397000 | A1* | 12/2023 | Wifvesson | H04W 8/005 |
| 2023/0397007 | A1* | 12/2023 | Wifvesson | H04W 12/08 |
| 2024/0022908 | A1* | 1/2024 | Baskaran | H04W 12/069 |
| 2024/0107297 | A1* | 3/2024 | Lehtovirta | H04L 63/06 |
| 2025/0184879 | A1* | 6/2025 | Paladugu | H04W 8/005 |

OTHER PUBLICATIONS

Samsung, "Updates to solution#1 in TR 33.847 S3-202611", 3GPP TSG-SA3 Meeting #100bis-e, Oct. 16, 2020, total 5 pages.

3GPP TS 23.287 V16.5.0: "3rd Generation Partnership Project; Technical Specification Group Services and System Aspects; Architecture enhancements for 5G System (5GS) to support Vehicle-to-Everything (V2X) services(Release 16)", Dec. 2020, total 58 pages.

3GPP TS 23.303 V16.0.0: "3rd Generation Partnership Project; Technical Specification Group Services and System Aspects; Proximity-based services (ProSe); Stage 2(Release 16)", Jul. 2020, total 130 pages.

3GPP TS 23.502 V16.7.1: "3rd Generation Partnership Project; Technical Specification Group Services and System Aspects; Procedures for the 5G System (5GS); Stage 2(Release 16)", Jan. 2021, total 603 pages.

3GPP TS 33.501 V15.11.0: "3rd Generation Partnership Project; Technical Specification Group Services and System Aspects; Security architecture and procedures for 5G system (Release 15)", Dec. 2020, total 193 pages.

3GPP TR 33.847 V0.3.0: "3rd Generation Partnership Project; Technical Specification Group Services and System Aspects; Study on security aspects of enhancement for proximity based services in the 5G System (5GS)(Release 17)", Nov. 2020, total 73 pages.

* cited by examiner

METHOD, SYSTEM, AND APPARATUS FOR GENERATING KEY FOR INTER-DEVICE COMMUNICATION

CROSS-REFERENCE TO RELATED APPLICATIONS

This application is a continuation of International Application No. PCT/CN2021/071149, filed on Jan. 11, 2021, the disclosure of which is hereby incorporated by reference in its entirety.

TECHNICAL FIELD

This application relates to the communication field, and more specifically, to a method, system, and apparatus for generating a key for communication between remote user equipment and a UE-to-network relay.

BACKGROUND

With rapid development of mobile communication, to meet communication requirements of different services in different scenarios, a device-to-device proximity-based services (ProSe) communication model is proposed, which allows user equipment (UE) to directly establish a communication connection to another user equipment. In a communication model, UE accesses an operator network with assistance of another UE, to perform service interaction with a data network.

For example, in a process in which remote user equipment (Remote UE) obtains a service through a UE-to-network relay, to ensure communication security, a secure connection needs to be established between the remote UE and the UE-to-network relay. However, a communication connection is dynamically established through the UE-to-network relay as required. Shared security information cannot be preconfigured between the remote UE and the UE-to-network relay, and the secure connection between the remote UE and the UE-to-network relay cannot be established based on the preconfigured shared security information. Therefore, a method is urgently required, to dynamically establish the secure connection between the remote UE and the UE-to-network relay.

SUMMARY

This application provides a method, system, and apparatus for generating a key for inter-device communication, so that a secure communication connection is dynamically established between user equipment.

According to a first aspect, a method for generating a key for inter-device communication is provided. The method includes: First user equipment generates a first temporary identifier based on a first key; the first user equipment sends a first request to second user equipment, where the first request is used to establish a communication connection between the first user equipment and the second user equipment, and the first request includes the first temporary identifier and a relay service code; and the first user equipment generates a shared key based on a second key and the relay service code, where the shared key is used to protect the communication connection between the first user equipment and the second user equipment, and the second key and the first key each are a key generated in an authentication procedure or a key obtained through derivation based on an intermediate key generated in an authentication procedure.

The shared key is used to protect the communication connection between the first user equipment and the second user equipment. In a possible implementation, the first user equipment and the second user equipment separately obtain an intermediate key or a session key through derivation based on the generated shared key, and further obtain an encryption key and/or an integrity protection key of a message or data between the first user equipment and the second user equipment through derivation based on the intermediate key or the session key. The encryption key and/or the integrity protection key are/is used to protect the communication connection between the first user equipment and the second user equipment. In another possible implementation, the first user equipment and the second user equipment separately obtain an encryption key and/or an integrity protection key of a message or data between the first user equipment and the second user equipment through derivation based on the generated shared key. The encryption key and/or the integrity protection key are/is used to protect the communication connection between the first user equipment and the second user equipment.

According to the solution, the first user equipment generates the shared key that can be used to protect the communication connection between the first user equipment and the second user equipment, so that a secure communication connection is dynamically established between the user equipment.

With reference to the first aspect, in some implementations of the first aspect, the second key is the same as the first key, and the second key and the first key each are a key Kausf generated in the authentication procedure or a key obtained through derivation based on the Kausf.

With reference to the first aspect, in some implementations of the first aspect, the second key is different from the first key. The first key is a key Kausf generated in the authentication procedure, and the second key is a key obtained through derivation based on the Kausf.

With reference to the first aspect, in some implementations of the first aspect, the second key is different from the first key. The second key is a key Kausf generated in the authentication procedure, and the first key is a key obtained through derivation based on the Kausf.

With reference to the first aspect, in some implementations of the first aspect, that first user equipment generates a first temporary identifier based on a first key includes: The first user equipment generates the first temporary identifier based on the first key, a network identifier of the first user equipment, and routing information, where the network identifier of the first user equipment is used by a network side to identify information about the first user equipment, and the routing information is information used to determine a core network element related to the first user equipment.

The core network element related to the first user equipment may be specifically a core network element in the authentication procedure of the first user equipment, for example, a data management network element and a proximity-based services security function network element.

According to the technical solution, the first user equipment generates the first temporary identifier based on the first key, the network identifier of the first user equipment, and the routing information, and sends the first temporary identifier to the second user equipment. The second user equipment sends the first temporary identifier to the network side, so that the core network element related to the first user equipment can obtain the second key based on the first temporary identifier. Further, the core network element determines the shared key based on the second key, and sends the shared key to the second user equipment. Therefore, the first user equipment and the second user equipment obtain the same shared key, and then the secure communication connection can be dynamically established between the first user equipment and the second user equipment based on the shared key.

With reference to the first aspect, in some implementations of the first aspect, that the first user equipment generates the first temporary identifier based on the first key, a network identifier of the first user equipment, and routing information includes: The first user equipment obtains a second temporary identifier based on the first key and the network identifier of the first user equipment that are used as input parameters of a first preset algorithm; and splices the second temporary identifier and the routing information to obtain the first temporary identifier.

With reference to the first aspect, in some implementations of the first aspect, the network identifier of the first user equipment is a subscription permanent identifier SUPI, an international mobile subscriber identity IMSI, or a generic public subscription identifier GPSI; and the routing information is a routing indicator.

With reference to the first aspect, in some implementations of the first aspect, the method includes: The first user equipment sends a non-access stratum NAS message to a mobility management network element, where the NAS message includes capability information, and the capability information indicates that the first user equipment supports to act as remote user equipment.

According to the technical solution, the first user equipment sends, to the network side, the NAS message including the capability information, so that the NAS message is used as a basis for the network side to determine whether the first user equipment can support to act as the remote user equipment. This helps the first user equipment generate the shared key, and then the secure communication connection is dynamically established between the user equipment.

With reference to the first aspect, in some implementations of the first aspect, the first request further includes a first freshness parameter; and that the first user equipment generates a shared key based on a second key and the relay service code includes: The first user equipment generates the shared key based on the second key, the relay service code, and the first freshness parameter.

According to the technical solution, the first user equipment generates the shared key based on the second key, the relay service code, and the first freshness parameter. This ensures that, with a same second key and a same relay service code, different shared keys are generated when the first user equipment establishes direct communication with different user equipment, so that the secure communication connection established between the user equipments is more reliable.

With reference to the first aspect, in some implementations of the first aspect, the method further includes: The first user equipment receives a security mode command from the second user equipment, where the security mode command includes a second freshness parameter; and that the first user equipment generates a shared key based on a second key and the relay service code includes: The first user equipment generates the shared key based on the second key, the relay service code, and the second freshness parameter.

According to the technical solution, the first user equipment generates the shared key based on the second key, the relay service code, and the second freshness parameter. This ensures that, with a same second key and a same relay service code, different shared keys are generated when the first user equipment establishes direct communication with different user equipment, so that the secure communication connection established between the user equipment is more reliable.

With reference to the first aspect, in some implementations of the first aspect, the first request further includes a first freshness parameter. The method further includes: The first user equipment receives a security mode command from the second user equipment, where the security mode command includes a second freshness parameter; and that the first user equipment generates a shared key based on a second key and the relay service code includes: The first user equipment generates the shared key based on the second key, the relay service code, the first freshness parameter, and the second freshness parameter.

According to the technical solution, the first user equipment generates the shared key based on the second key, the relay service code, the first freshness parameter, and the second freshness parameter. This ensures that, with a same second key and a same relay service code, different shared keys are generated when the first user equipment establishes direct communication with different user equipment, so that the secure communication connection established between the user equipment is more reliable.

With reference to the first aspect, in some implementations of the first aspect, the security mode command further includes a security algorithm; and the method further includes: The first user equipment obtains a communication key based on the shared key and the security algorithm, where the communication key is used to protect the communication connection between the first user equipment and the second user equipment. Specifically, that the first user equipment obtains a communication key based on the shared key and the security algorithm further includes: The first user equipment generates an intermediate key/session key based on the shared key, and obtains the communication key based on the intermediate key/session key and the security algorithm.

According to the technical solution, the first user equipment obtains the communication key based on the shared key and the security algorithm, so that the secure communication connection established between the user equipment is protected, and is more reliable.

According to a second aspect, a method for generating a key for inter-device communication is provided. The method includes: A first network element generates a first temporary identifier based on a first key; the first network element receives a key obtaining message from a second network element, where the key obtaining message includes an identifier of first user equipment and a relay service code, the identifier of the first user equipment includes the first temporary identifier or a network identifier of the first user equipment, and the network identifier of the first user equipment is used by a network side to identify information about the first user equipment; the first network element generates a shared key based on the identifier of the first user equipment, the relay service code, and a second key, where the shared key is used to protect a communication connection between the first user equipment and second user equipment, and the second key and the first key each are a key generated in an authentication procedure of the first user equipment or a key obtained through derivation based on an intermediate key generated in an authentication procedure of the first user equipment; and the first network element sends the shared key to the second network element. Further, the second network element sends the shared key to the second user equipment.

According to the technical solution, the first network element generates the shared key that can be used to protect the communication connection between the first user equipment and the second user equipment, and the shared key is sent to the second user equipment, so that a secure communication connection is dynamically established between the second user equipment and the first user equipment based on the shared key.

With reference to the second aspect, in some implementations of the second aspect, that the first network element generates a shared key based on the identifier of the first user equipment, the relay service code, and a second key includes: The first network element obtains the second key based on the identifier of the first user equipment; and the first network element generates the shared key based on the second key and the relay service code.

According to the technical solution, the first network element obtains the second key based on the identifier of the first user equipment, and then the first network element can generate, based on the second key and the relay service code, the shared key used to protect the inter-device communication connection, so that the secure communication connection is dynamically established between the user equipment.

With reference to the second aspect, in some implementations of the second aspect, the second key is the same as the first key, and the second key and the first key each are a key Kausf generated in the authentication procedure or a key obtained through derivation based on the Kausf.

With reference to the second aspect, in some implementations of the second aspect, the second key is different from the first key. The first key is a key Kausf generated in the authentication procedure, and the second key is a key obtained through derivation based on the Kausf.

With reference to the second aspect, in some implementations of the second aspect, the second key is different from the first key. The second key is a key Kausf generated in the authentication procedure, and the first key is a key obtained through derivation based on the Kausf.

With reference to the second aspect, in some implementations of the second aspect, that a first network element generates a first temporary identifier based on a first key includes: The first network element generates the first temporary identifier based on the first key, the network identifier of the first user equipment, and routing information, where the network identifier of the first user equipment is used by the network side to identify the information about the first user equipment, and the routing information is information used to determine a core network element related to the first user equipment.

With reference to the second aspect, in some implementations of the second aspect, that the first network element generates the first temporary identifier based on the first key, the network identifier of the first user equipment, and routing information includes: The first network element obtains a second temporary identifier based on the first key and the network identifier of the first user equipment that are used as input parameters of a first preset algorithm; and splices the second temporary identifier and the routing information to obtain the first temporary identifier.

With reference to the second aspect, in some implementations of the second aspect, the network identifier of the first user equipment is a subscription permanent identifier SUPI, an international mobile subscriber identity IMSI, or a generic public subscription identifier GPSI; and the routing information is a routing indicator.

With reference to the second aspect, in some implementations of the second aspect, the method further includes: The first network element receives indication information from a third network element in the authentication procedure of the first user equipment; and the first network element generates the first temporary identifier based on the first key in response to the indication information.

According to the technical solution, the first network element generates the first temporary identifier in response to the indication information sent by the third network element. Then, the first network element associates the generated first temporary identifier with the second key and stores the generated first temporary identifier and the second key. Subsequently, when the first network element receives the key obtaining message that carries the first temporary identifier and that is from the second network element, the first network element can obtain the second key based on the first temporary identifier. In this way, the first network element can determine the shared key based on the second key, and send the shared key to the second user equipment through one or more intermediate network elements, so that the secure communication connection is dynamically established between the first user equipment and the second user equipment based on the shared key.

With reference to the second aspect, in some implementations of the second aspect, that the first network element receives indication information from a third network element in the authentication procedure of the first user equipment; and the first network element generates the first temporary identifier based on the first key in response to the indication information includes: The first network element receives capability information from a fourth network element in the authentication procedure of the first user equipment, where the capability information indicates that the first user equipment supports to act as remote UE; and the first network element generates the first temporary identifier based on the first key in response to the indication information and the capability information.

According to the technical solution, the first network element generates the first temporary identifier in response to the indication information sent by the third network element and the capability information sent by the fourth network element. Then, the first network element associates the generated first temporary identifier with the second key and stores the generated first temporary identifier and the second key. Subsequently, when the first network element receives the key obtaining message that carries the first temporary identifier and that is from the second network element, the first network element can obtain the second key based on the first temporary identifier. In this way, the first network element can determine the shared key based on the second key, and send the shared key to the second user equipment through one or more intermediate network elements, so that the secure communication connection is dynamically established between the first user equipment and the second user equipment based on the shared key.

With reference to the second aspect, in some implementations of the second aspect, the method further includes: The first network element sends the first temporary identifier to the third network element.

According to the technical solution, the first network element sends the first temporary identifier to the third network element, and the third network element stores the first temporary identifier and an identifier of the first network element in context information of the first user equipment. Subsequently, the second network element may obtain the identifier of the first network element and the network identifier of the first user equipment from the third network element based on the first temporary identifier. Then, the second network element can obtain the shared key from the first network element based on the network identifier of the first user equipment, and send the shared key to the second user equipment, so that the secure communication connection is dynamically established between the first user equipment and the second user equipment based on the shared key.

With reference to the second aspect, in some implementations of the second aspect, the key obtaining message further includes a first freshness parameter; and that the first network element generates a shared key based on the identifier of the first user equipment, the relay service code, and a second key includes: The first network element generates the shared key based on the identifier of the first user equipment, the relay service code, the second key, and the first freshness parameter.

According to the technical solution, the first network element generates the shared key based on the identifier of the first user equipment, the relay service code, the second key, and the first freshness parameter. This ensures that, with a same second key and a same relay service code, different shared keys are generated when the first user equipment establishes direct communication with different user equipment, so that the secure communication connection established between the user equipment is more reliable.

With reference to the second aspect, in some implementations of the second aspect, the method further includes: The first network element generates a second freshness parameter; and that the first network element generates a shared key based on the identifier of the first user equipment, the relay service code, and a second key includes: The first network element generates the shared key based on the identifier of the first user equipment, the relay service code, the second key, and the second freshness parameter.

According to the technical solution, the first network element generates the shared key based on the identifier of the first user equipment, the relay service code, the second key, and the second freshness parameter. This ensures that, with a same second key and a same relay service code, different shared keys are generated when the first user equipment establishes direct communication with different user equipment, so that the secure communication connection established between the user equipment is more reliable.

With reference to the second aspect, in some implementations of the second aspect, the key obtaining message further includes a first freshness parameter; and the method further includes: The first network element generates a second freshness parameter; and that the first network element generates a shared key based on the identifier of the first user equipment, the relay service code, and a second key includes: The first network element generates the shared key based on the identifier of the first user equipment, the relay service code, the second key, the first freshness parameter, and the second freshness parameter.

According to the technical solution, the first network element generates the shared key based on the identifier of the first user equipment, the relay service code, the second key, the first freshness parameter, and the second freshness parameter. This ensures that, with a same second key and a same relay service code, different shared keys are generated when the first user equipment establishes direct communication with different user equipment, so that the secure communication connection established between the user equipment is more reliable.

With reference to the second aspect, in some implementations of the second aspect, the first network element is an authentication function network element.

With reference to the second aspect, in some implementations of the second aspect, the second network element is a mobility management network element, an authentication function network element, or a proximity-based services security function network element.

With reference to the second aspect, in some implementations of the second aspect, the third network element is a data management network element.

With reference to the second aspect, in some implementations of the second aspect, the fourth network element is a mobility management network element.

According to a third aspect, a method for generating a key for inter-device communication is provided. The method includes: A fifth network element obtains a first temporary identifier and a third key, where the third key is a key obtained through derivation based on an intermediate key generated in an authentication procedure; the fifth network element receives a key obtaining message from a sixth network element, where the key obtaining message includes the first temporary identifier and a relay service code; the fifth network element generates a shared key based on the first temporary identifier, the relay service code, and a third key, where the shared key is used to protect a communication connection between first user equipment and second user equipment; and the fifth network element sends the shared key to the sixth network element.

According to the technical solution, the fifth network element generates the shared key that can be used to protect the communication connection between the first user equipment and the second user equipment, so that a secure communication connection is dynamically established between the user equipment.

With reference to the third aspect, in some implementations of the third aspect, that the fifth network element generates a shared key based on the first temporary identifier, the relay service code, and a third key includes: That the fifth network element generates a shared key based on the first temporary identifier, the relay service code, and a third key includes: The fifth network element obtains the third key based on the first temporary identifier, and the fifth network element generates the shared key based on the third key and the relay service code.

According to the technical solution, the fifth network element obtains the third key based on the first temporary identifier, and then the fifth network element can generate, based on the third key and the relay service code, the shared key used to protect the inter-device communication connection. The fifth network element sends the shared key to the second user equipment through one or more intermediate network elements. This ensures that the shared key is dynamically established between the first user equipment and the second user equipment, so that the secure communication connection is dynamically established between the user equipments based on the shared key.

With reference to the third aspect, in some implementations of the third aspect, that a fifth network element obtains a first temporary identifier includes: The fifth network element receives the first temporary identifier from a first network element, where the first temporary identifier is generated based on a first intermediate key, and the first intermediate key is an intermediate key generated in an authentication procedure of the first user equipment or a key obtained through derivation based on an intermediate key generated in an authentication procedure; or the fifth network element generates the first temporary identifier based on a third intermediate key.

According to the technical solution, the fifth network element obtains the first temporary identifier, and then the fifth network element can obtain the third key based on the first temporary identifier, so that the fifth network element can generate, based on the third key and the relay service code, the shared key used to protect the inter-device communication connection. The fifth network element sends the shared key to the second user equipment through one or more intermediate network elements. This ensures that the shared key is dynamically established between the first user equipment and the second user equipment, so that the secure communication connection is dynamically established between the user equipments based on the shared key.

With reference to the third aspect, in some implementations of the third aspect, the third key is a key obtained through derivation based on a key Kausf generated in the authentication procedure.

With reference to the third aspect, in some implementations of the third aspect, that the first temporary identifier is generated based on the first key includes: The first temporary identifier is generated based on the first key, a network identifier of the first user equipment, and routing information, where the network identifier of the first user equipment is used by a network side to identify information about the first user equipment, and the routing information is information used to determine a core network element related to the first user equipment.

With reference to the third aspect, in some implementations of the third aspect, that the first temporary identifier is generated based on the first key, a network identifier of the first user equipment, and routing information includes: A second temporary identifier is generated based on the first key and the network identifier of the first user equipment that are used as input parameters of a first preset algorithm; and the first temporary identifier is obtained by splicing the second temporary identifier and the routing information.

With reference to the third aspect, in some implementations of the third aspect, the network identifier of the first user equipment is a subscription permanent identifier SUPI, an international mobile subscriber identity IMSI, or a generic public subscription identifier GPSI; and the routing information is a routing indicator.

With reference to the third aspect, in some implementations of the third aspect, the key obtaining message further includes a first freshness parameter; and that the fifth network element generates a shared key based on the first temporary identifier, the relay service code, and a third key includes: The fifth network element generates the shared key based on the first temporary identifier, the relay service code, the third key, and the first freshness parameter.

According to the technical solution, the fifth network element generates the shared key based on the first temporary identifier, the relay service code, the second key, and the first freshness parameter. This ensures that, with a same second key and a same relay service code, different shared keys are generated when the first user equipment establishes direct communication with different user equipments, so that the secure communication connection established between the user equipments is more reliable.

With reference to the third aspect, in some implementations of the third aspect, the method further includes: The fifth network element generates a second freshness parameter; and that the fifth network element generates a shared key based on the first temporary identifier, the relay service code, and a third key includes: The fifth network element generates the shared key based on the first temporary identifier, the relay service code, the third key, and the second freshness parameter.

According to the technical solution, the fifth network element generates the shared key based on the first temporary identifier, the relay service code, the second key, and the second freshness parameter. This ensures that, with a same second key and a same relay service code, different shared keys are generated when the first user equipment establishes direct communication with different user equipment, so that the secure communication connection established between the user equipment is more reliable.

With reference to the third aspect, in some implementations of the third aspect, the key obtaining message further includes a first freshness parameter; and the method further includes: That the fifth network element generates a shared key based on the first temporary identifier, the relay service code, and a third key includes: The fifth network element generates the shared key based on the first temporary identifier, the relay service code, the third key, the first freshness parameter, and the second freshness parameter.

According to the technical solution, the fifth network element generates the shared key based on the first temporary identifier, the relay service code, the second key, the first temporary identifier, and the second freshness parameter. This ensures that, with a same second key and a same relay service code, different shared keys are generated when the first user equipment establishes direct communication with different user equipment, so that the secure communication connection established between the user equipment is more reliable.

With reference to the third aspect, in some implementations of the third aspect, the fifth network element is a first proximity-based services security function network element.

With reference to the third aspect, in some implementations of the third aspect, the sixth network element is a second proximity-based services security function network element.

According to a fourth aspect, a system for generating a key for inter-device communication is provided. The system includes: a first network element, configured to generate a first temporary identifier based on a first key; and a second network element, configured to send a key obtaining message to the first network element, where the key obtaining message includes an identifier of first user equipment and a relay service code, the identifier of the first user equipment includes the first temporary identifier or a network identifier of the first user equipment, and the network identifier of the first user equipment is used by a network side to identify information about the first user equipment. The first network element is further configured to generate a shared key based on the identifier of the first user equipment, the relay service code, and a second key, where the shared key is used to protect a communication connection between the first user equipment and second user equipment, and the second key and the first key each are a key generated in an authentication procedure of the first user equipment or a key obtained through derivation based on an intermediate key generated in an authentication procedure of the first user equipment; and the first network element sends the shared key to the second network element.

According to the technical solution, the first network element generates the shared key that can be used to protect the communication connection between the first user equipment and the second user equipment, so that a secure communication connection is dynamically established between the user equipment.

With reference to the fourth aspect, in some implementations of the fourth aspect, that the first network element is further configured to generate a shared key based on the identifier of the first user equipment, the relay service code, and a second key includes: The first network element is further configured to obtain the second key based on the identifier of the first user equipment, and the first network element is further configured to generate the shared key based on the second key and the relay service code.

According to the technical solution, the first network element obtains the second key based on the identifier of the first user equipment, and then the first network element can generate, based on the second key and the relay service code, the shared key used to protect the inter-device communication connection, so that the secure communication connection is dynamically established between the user equipment.

With reference to the fourth aspect, in some implementations of the fourth aspect, the second key is the same as the first key, and the second key and the first key each are a key Kausf generated in the authentication procedure or a key obtained through derivation based on the Kausf.

With reference to the fourth aspect, in some implementations of the fourth aspect, the second key is different from the first key. The first key is a key Kausf generated in the authentication procedure, and the second key is a key obtained through derivation based on the Kausf.

With reference to the fourth aspect, in some implementations of the fourth aspect, the second key is different from the first key. The second key is a key Kausf generated in the authentication procedure, and the first key is a key obtained through derivation based on the Kausf.

With reference to the fourth aspect, in some implementations of the fourth aspect, that a first network element is configured to generate a first temporary identifier based on a first key includes: The first network element is further configured to generate the first temporary identifier based on the first key, the network identifier of the first user equipment, and routing information, where the network identifier of the first user equipment is used by the network side to identify the information about the first user equipment, and the routing information is information used to determine a core network element related to the first user equipment.

According to the technical solution, the first network element generates the first temporary identifier based on the first key, the network identifier of the first user equipment, and the routing information, and then the core network element related to the first user equipment can obtain the second key based on the first temporary identifier. Further, the shared key is determined based on the second key and sent to the second user equipment. This ensures that the first user equipment and the second user equipment obtain the same shared key, so that the secure communication connection is dynamically established between the user equipments based on the shared key.

With reference to the fourth aspect, in some implementations of the fourth aspect, that the first network element is further configured to generate the first temporary identifier based on the first key, the network identifier of the first user equipment, and routing information includes: The first network element is further configured to obtain a second temporary identifier based on the first key and the network identifier of the first user equipment that are used as input parameters of a first preset algorithm; and splice the second temporary identifier and the routing information to obtain the first temporary identifier.

According to the technical solution, the first network element generates the first temporary identifier based on the first key, the network identifier of the first user equipment, and the routing information, and then the core network element related to the first user equipment can obtain the second key based on the first temporary identifier. In this way, the first network element can determine the shared key based on the second key, and send the shared key to the second user equipment through one or more intermediate network elements, so that the secure communication connection is dynamically established between the user equipments.

With reference to the fourth aspect, in some implementations of the fourth aspect, the network identifier of the first user equipment is a subscription permanent identifier SUPI, an international mobile subscriber identity IMSI, or a generic public subscription identifier GPSI; and the routing information is a routing indicator.

With reference to the fourth aspect, in some implementations of the fourth aspect, the system further includes: a third network element, where the third network element is configured to send first indication information to the first network element in the authentication procedure of the first user equipment; and the first network element is configured to generate the first temporary identifier based on the first key in response to the first indication information.

According to the technical solution, the first network element generates the first temporary identifier in response to the indication information sent by the third network element, and then the first network element can obtain the second key based on the first temporary identifier. In this way, the first network element can determine the shared key based on the second key, and send the shared key to the second user equipment through the one or more intermediate network elements, so that the secure communication connection is dynamically established between the user equipment.

With reference to the fourth aspect, in some implementations of the fourth aspect, the system further includes: a fourth network element, where the fourth network element is configured to send capability information to the first network element in the authentication procedure of the first user equipment, and the capability information indicates that the first user equipment supports to act as remote UE; and the first network element is configured to generate the first temporary identifier based on the first key in response to the first indication information and the capability information.

According to the technical solution, the first network element generates the first temporary identifier in response to the indication information sent by the third network element and the capability information sent by the fourth network element, and then the first network element can obtain the second key based on the first temporary identifier. In this way, the first network element can determine the shared key based on the second key, and send the shared key to the second user equipment through the one or more intermediate network elements, so that the secure communication connection is dynamically established between the user equipments.

With reference to the fourth aspect, in some implementations of the fourth aspect, the first network element is further configured to send the first temporary identifier to the third network element.

According to the technical solution, the first network element sends the first temporary identifier to the third network element, and the third network element stores the first temporary identifier in context information of the first user equipment, so that the third network element determines an identifier of the first network element from context of the first user equipment based on the first temporary identifier. Then, the first network element can obtain the second key based on the first temporary identifier, determine the shared key based on the second key, and send the shared key to the second user equipment through the one or more intermediate network elements, so that the secure communication connection is dynamically established between the user equipment.

With reference to the fourth aspect, in some implementations of the fourth aspect, the second network element is further configured to send the first temporary identifier to the third network element; and the third network element is further configured to send the identifier of the first network element to the second network element.

According to the technical solution, the second network element sends the first temporary identifier to the third network element (the first temporary identifier sent by the first user equipment to the second network element through the one or more intermediate network elements), and the third network element determines the identifier of the first network element from context of the first user equipment based on the first temporary identifier. Then, the first network element can obtain the second key based on the first temporary identifier, determine the shared key based on the second key, and send the shared key to the second user equipment through the one or more intermediate network elements, so that the secure communication connection is dynamically established between the user equipment.

With reference to the fourth aspect, in some implementations of the fourth aspect, the third network element is further configured to send the identifier of the first network element and the network identifier of the first user equipment to the second network element.

According to the technical solution, the third network element sends the identifier of the first network element and the network identifier of the first user equipment to the second network element, so that the second network element finds the first network element based on the identifier of the first network element. Then, the first network element can obtain the second key based on the first temporary identifier or the network identifier of the first user equipment. In this way, the first network element can determine the shared key based on the second key, and send the shared key to the second user equipment through the one or more intermediate network elements, so that the secure communication connection is dynamically established between the user equipments.

With reference to the fourth aspect, in some implementations of the fourth aspect, the key obtaining message further includes a first freshness parameter; and that the first network element is configured to generate a shared key based on the identifier of the first user equipment, the relay service code, and a second key includes: The first network element is configured to generate the shared key based on the identifier of the first user equipment, the relay service code, the second key, and the first freshness parameter.

According to the technical solution, the first network element generates the shared key based on the identifier of the first user equipment, the relay service code, the second key, and the first freshness parameter. This ensures that, with a same second key and a same relay service code, different shared keys are generated when the first user equipment establishes direct communication with different user equipment, so that the secure communication connection established between the user equipment is more reliable.

With reference to the fourth aspect, in some implementations of the fourth aspect, the first network element is further configured to generate a second freshness parameter; and that the first network element is configured to generate a shared key based on the identifier of the first user equipment, the relay service code, and a second key includes: The first network element is configured to generate the shared key based on the identifier of the first user equipment, the relay service code, the second key, and the second freshness parameter.

According to the technical solution, the first network element generates the shared key based on the identifier of the first user equipment, the relay service code, the second key, and the second freshness parameter. This ensures that, with a same second key and a same relay service code, different shared keys are generated when the first user equipment establishes direct communication with different user equipment, so that the secure communication connection established between the user equipment is more reliable.

With reference to the fourth aspect, in some implementations of the fourth aspect, the key obtaining message further includes a first freshness parameter; the first network element is further configured to generate a second freshness parameter; and that the first network element is configured to generate a shared key based on the identifier of the first user equipment, the relay service code, and a second key includes: The first network element is configured to generate the shared key based on the identifier of the first user equipment, the relay service code, the second key, the first freshness parameter, and the second freshness parameter.

According to the technical solution, the first network element generates the shared key based on the identifier of the first user equipment, the relay service code, the second key, the first freshness parameter, and the second freshness parameter. This ensures that, with a same second key and a same relay service code, different shared keys are generated when the first user equipment establishes direct communication with different user equipment, so that the secure communication connection established between the user equipment is more reliable.

With reference to the fourth aspect, in some implementations of the fourth aspect, the system further includes: the first user equipment and the second user equipment.

With reference to the fourth aspect, in some implementations of the fourth aspect, the first network element is an authentication function network element.

With reference to the fourth aspect, in some implementations of the fourth aspect, the second network element is a mobility management network element, an authentication function network element, or a proximity-based services security function network element.

With reference to the fourth aspect, in some implementations of the fourth aspect, the third network element is a data management network element.

With reference to the fourth aspect, in some implementations of the fourth aspect, the fourth network element is a mobility management network element.

According to a fifth aspect, an apparatus for generating a key for inter-device communication is provided. The apparatus includes: a memory, configured to store computer instructions; and a processor, configured to execute the computer instructions stored in the memory, so that the apparatus performs the method according to any one of the first aspect or the possible implementations of the first aspect.

According to the technical solution, the apparatus for generating a key for inter-device communication performs the method according to any one of the first aspect or the possible implementations of the first aspect, so that the apparatus generates a shared key that can be used to protect a communication connection between first user equipment and second user equipment, and then a secure communication connection is dynamically established between the user equipment.

According to a sixth aspect, an apparatus for generating a key for inter-device communication is provided. The apparatus includes: a memory, configured to store computer instructions; and a processor, configured to execute the computer instructions stored in the memory, so that the apparatus performs the method according to any one of the second aspect or the possible implementations of the second aspect.

According to the technical solution, the apparatus for generating a key for inter-device communication performs the method according to any one of the second aspect or the possible implementations of the second aspect, so that the apparatus generates a shared key that can be used to protect a communication connection between first user equipment and second user equipment, and then a secure communication connection is dynamically established between the user equipment.

According to a seventh aspect, an apparatus for generating a key for inter-device communication is provided. The apparatus includes: a memory, configured to store computer instructions; and a processor, configured to execute the computer instructions stored in the memory, so that the apparatus performs the method according to any one of the third aspect or the possible implementations of the third aspect.

According to the technical solution, the apparatus for generating a key for inter-device communication performs the method according to any one of the third aspect or the possible implementations of the third aspect, so that the apparatus generates a shared key that can be used to protect a communication connection between first user equipment and second user equipment, and then a secure communication connection is dynamically established between the user equipment.

According to an eighth aspect, a computer-readable storage medium is provided. The computer-readable storage medium stores a computer program. When the computer program is executed by a communication apparatus, the communication apparatus is enabled to perform the method according to any one of the first aspect or the possible implementations of the first aspect.

According to the technical solution, the computer-readable storage medium stores the computer program, and when the computer program is executed by the apparatus for generating a key for inter-device communication, the apparatus generates, by performing the method according to any one of the first aspect or the possible implementations of the first aspect, a shared key that can be used to protect a communication connection between first user equipment and second user equipment, so that a secure communication connection is dynamically established between the user equipment.

According to a ninth aspect, a computer-readable storage medium is provided. The computer-readable storage medium stores a computer program. When the computer program is executed by a communication apparatus, the communication apparatus is enabled to perform the method according to any one of the second aspect or the possible implementations of the second aspect.

According to the technical solution, the computer-readable storage medium stores the computer program, and when the computer program is executed by the apparatus for generating a key for inter-device communication, the apparatus generates, by performing the method according to any one of the second aspect or the possible implementations of the second aspect, a shared key that can be used to protect a communication connection between first user equipment and second user equipment, so that a secure communication connection is dynamically established between the user equipment.

According to a tenth aspect, a computer-readable storage medium is provided. The computer-readable storage medium stores a computer program. When the computer program is executed by a communication apparatus, the communication apparatus is enabled to perform the method according to any one of the third aspect or the possible implementations of the third aspect.

According to the technical solution, the computer-readable storage medium stores the computer program, and when the computer program is executed by the apparatus for generating a key for inter-device communication, the apparatus generates, by performing the method according to any one of the third aspect or the possible implementations of the third aspect, a shared key that can be used to protect a communication connection between first user equipment and second user equipment, so that a secure communication connection is dynamically established between the user equipment.

According to an eleventh aspect, a chip system is provided. The chip system includes a processor, configured to invoke a computer program from a memory and run the computer program, so that a device on which the chip system is installed performs the communication method according to any one of the first aspect or the possible implementations of the first aspect.

Optionally, the chip system may further include the memory. The memory stores instructions. The processor is configured to execute the instructions stored in the memory or other instructions. When the instructions are executed, the processor is configured to implement the method according to any one of the first aspect or the possible implementations of the first aspect.

Optionally, the chip system may be integrated into user equipment.

According to a twelfth aspect, a chip system is provided. The chip system includes a processor, configured to invoke a computer program from a memory and run the computer program, so that a device on which the chip system is installed performs the communication method according to any one of the second aspect or the possible implementations of the second aspect.

Optionally, the chip system may further include the memory. The memory stores instructions. The processor is configured to execute the instructions stored in the memory or other instructions. When the instructions are executed, the processor is configured to implement the method according to any one of the second aspect or the possible implementations of the second aspect.

Optionally, the chip system may be integrated into a network device.

According to a thirteenth aspect, a chip system is provided. The chip system includes a processor, configured to invoke a computer program from a memory and run the computer program, so that a device on which the chip system is installed performs the communication method according to any one of the third aspect or the possible implementations of the third aspect.

Optionally, the chip system may further include the memory. The memory stores instructions. The processor is configured to execute the instructions stored in the memory or other instructions. When the instructions are executed, the processor is configured to implement the method according to any one of the third aspect or the possible implementations of the third aspect.

Optionally, the chip system may be integrated into a network device.

In conclusion, according to the foregoing technical solutions, a key for inter-device communication is generated, so that a secure communication connection is dynamically established between user equipment.

DETAILED DESCRIPTION OF ILLUSTRATIVE EMBODIMENTS

The following describes technical solutions of this application with reference to accompanying drawings.

A wireless communication system mentioned in embodiments of this application includes, but is not limited to, a global system of mobile communication (GSM) system, a long term evolution (LTE) frequency division duplex (FDD) system, LTE time division duplex (TDD), a wideband code division multiple access (WCDMA) system, a code division multiple access (CDMA) system, time division-synchronous code division multiple access (TD-SCDMA), a general packet radio service (GPRS), an LTE system, an LTE-advanced (LTE-A) system, a universal mobile telecommunications system (UMTS), a worldwide interoperability for microwave access (WiMAX) communication system, a next generation communication system (for example, a 5G communication system), a converged system of a plurality of access systems, three application scenarios of an evolved system and a next generation 5G mobile communication system: enhanced mobile broadband (eMBB), ultra-reliable and low-latency communication (URLLC), and enhanced machine-type communication (eMTC), or a future new communication system.

Generally, a conventional communication system supports a limited quantity of connections and is easy to implement. However, with development of communication technologies, a mobile communication system not only supports conventional communication, but also supports, for example, device to device (D2D) communication, machine to machine (M2M) communication, machine type communication (MTC), and vehicle to everything (V2X) communication, for example, vehicle to vehicle (V2V) communication, vehicle to infrastructure (V2I) communication, vehicle to pedestrian (V2P) communication, and vehicle to network (V2N) communication.

A terminal device in embodiments of this application may include various access terminals, mobile devices, user terminals, or user apparatuses that have a wireless communication function, for example, user equipment (UE), a handheld terminal, a notebook computer, a subscriber unit, a cellular phone, a smartphone, a wireless data card, a personal digital assistant (PDA) computer, a tablet computer, a wireless modem (modem), a handheld device, a laptop computer, a cordless phone, a wireless local loop (WLL) station, a machine type communication (MTC) terminal, or another device that can access a network. The terminal device and an access network device communicate with each other by using an air interface technology. An application scenario is not limited in this embodiment of this application.

Figure 1:
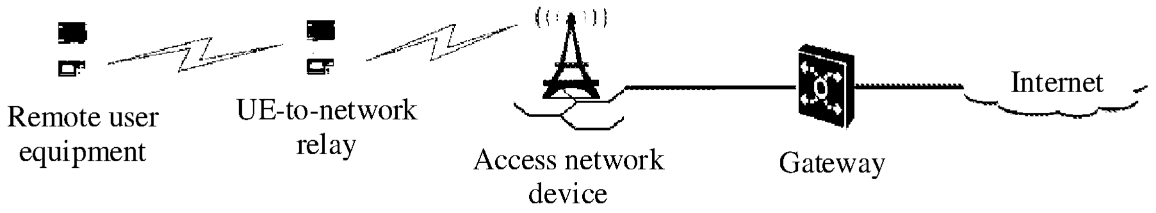
FIG. 1 is a schematic diagram of a scenario applied to an embodiment of this application.

FIG. 1 is a schematic diagram of a scenario applied to an embodiment of this application. As shown in FIG. 1, remote UE accesses an operator network through a UE-to-network relay, to perform service interaction with a data network.

It should be understood that FIG. 1 is merely an example of the schematic diagram of the application scenario in this embodiment of this application for ease of understanding. This is not limited in this embodiment of this application. The following describes network elements in the schematic diagram.

The remote UE is UE capable of proximity-based services communication, and can communicate with a data network (DN) through the UE-to-network relay. For example, the remote UE may be UE capable of accessing a network through another UE.

The UE-to-network relay may be UE that provides access for another UE and provides a network access function for the UE.

A (radio) access network ((R)AN) network element is a device that provides access for the terminal device, and includes a RAN device and an AN device. The RAN device is mainly a wireless network device in a 3GPP network. The AN device may be an access network device defined in a non-3GPP. The (R)AN) network element is mainly responsible for functions such as radio resource management, quality of service (QoS) management, and data compression and encryption on an air interface side. The access network device may include base stations in various forms, for example, a macro base station, a micro base station (also referred to as a small cell), a relay station, and an access point. In systems that use different radio access technologies, a device that has a base station function may have different names. For example, in a fifth generation (5G) system, the device is referred to as a RAN or a gNB (5G NodeB); in an LTE system, the device is referred to as an evolved NodeB (eNB or eNodeB); and in a third generation (3G) system, the device is referred to as a NodeB.

A gateway is mainly responsible for external connection to a data network, user plane data packet routing and forwarding, packet filtering, execution of a quality of service (QoS) control-related function, and the like. A user plane network element may receive user data from the data network, and transmit the user data to the terminal device through the access network device, or may receive user data from the terminal device through the access network device, and forward the user data to the data network. In a 5G communication system, the user plane network element may be a user plane function (UPF) network element. In a future communication system, the user plane network element may still be the UPF network element, or may have another name. This is not limited in this application.

Figure 2:
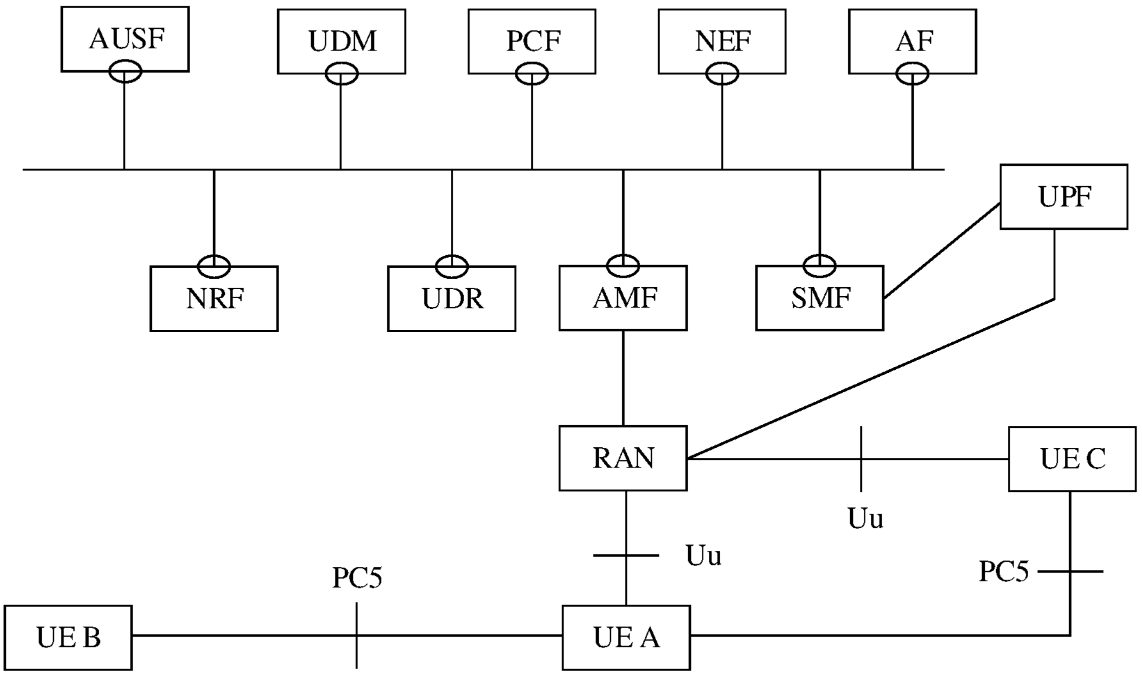
FIG. 2 is a schematic diagram of a network architecture applied to an embodiment of this application.

FIG. 2 is a schematic diagram of a 5G network architecture applied to an embodiment of this application. As an example instead of a limitation, embodiments of this application may be applied to a network architecture in a 5G communication system. The following separately describes network elements that may be in the network architecture.

An authentication server function (AUSF) network element supports an authentication function during access. In this embodiment of this application, the AUSF network element is configured to implement authentication when UE accesses a network, is configured to generate a key, and may be further configured to determine authorization of remote UE.

A unified data management (UDM) network element is configured to generate an authentication credential, process a subscriber identifier (for example, store and manage a subscription permanent identifier), control access authorization, manage subscription data, and the like. In this embodiment of this application, the UDM is configured to determine authorization of the remote UE, store user information, and the like.

A policy control function (PCF) network element supports providing a unified policy framework to control network behavior, provides a policy rule for a control layer network function, and is responsible for obtaining user subscription information related to policy decision-making.

A network exposure function (NEF) network element is configured to securely open, to the outside, a service, a capability, and the like that are provided by a function of the 3GPP network.

An application function (AF) network element is configured to provide a service, perform application-affected data routing, access the network exposure function network element, exchange service data with the PCF network element to perform policy control, or the like.

A network repository function (NRF) network element is used by a network function (NF) network element in a network to find another NF network element. For example, network function entities such as an AMF, an SMF, the PCF, and the UDM are all referred to as NF network elements. In this embodiment of this application, the NRF is configured to find routing information of the AUSF based on an instance identifier (Instance ID) of the AUSF, and send the routing information to a PSF.

A unified data repository (UDR) network element is configured to store user subscription data, service policy data, unstructured data, and the like.

An access and mobility management function (AMF) network element is mainly used for mobility management, access management, and the like. The AMF network element may be configured to implement functions other than session management in mobility management entity (MME) functions, for example, terminal mobility management, terminal authentication and de-authentication, terminal session access, slice access selection allowed by a terminal, lawful interception, or access authorization (or authentication).

A session management function (SMF) network element is mainly used for session management, internet protocol (IP) address allocation and management of a terminal device, selection and management of termination points of a user plane function and a policy control and charging function interface, a downlink data notification, or the like.

A user plane function (UPF) network element is used for packet routing and forwarding, quality of service (QoS) parameter processing of user plane data, or the like. User data may be transmitted to a data network (DN) through the network element.

PC5 is a reference point between UEs capable of proximity-based services communication, and is used for proximity-based services direct discovery (ProSe Direct Discovery), proximity-based services direct communication (ProSe Direct Communication), and a control plane connection and a user plane connection of a UE-to-network relay.

In FIG. 2, UE A may directly access a network through a Uu interface, or may first establish a connection to UE C through a PC5 interface, and then access the network through the UE C. UE B first establishes a connection to the UE A through the PC5 interface, and then accesses the network through the UE A. The UE C may access the network through the Uu interface, or may first establish a connection to the UE A through the PC5 interface, and then access the network through the UE A.

For example, in FIG. 2, both the UE A and the UE C may directly access the network through the Uu interface. Alternatively, the UE A may first establish the connection to the UE C through the PC5 interface, and then access the network through the UE C (in this case, the UE A is referred to as remote UE, and the UE C is referred to as a UE-to-network relay). The UE C may alternatively first establish the connection to the UE A through the PC5 interface, and then access the network through the UE A (in this case, the UE C is referred to as remote UE, and the UE A is referred to as a UE-to-network relay). The UE B first establishes the connection to the UE A through the PC5 interface, and then accesses the network through the UE A (in this case, the UE B is referred to as remote UE, and the UE A is referred to as a UE-to-network relay).

The UE A and the UE C each may be considered as a UE-to-network relay that provides a network connection function for another remote UE, or may be considered as remote UE capable of accessing the network through another UE-to-network relay.

The UE B may be considered as remote UE capable of accessing the network through another UE-to-network relay. For example, the UE B accesses the network through the UE-to-network relay A.

Figure 3A:
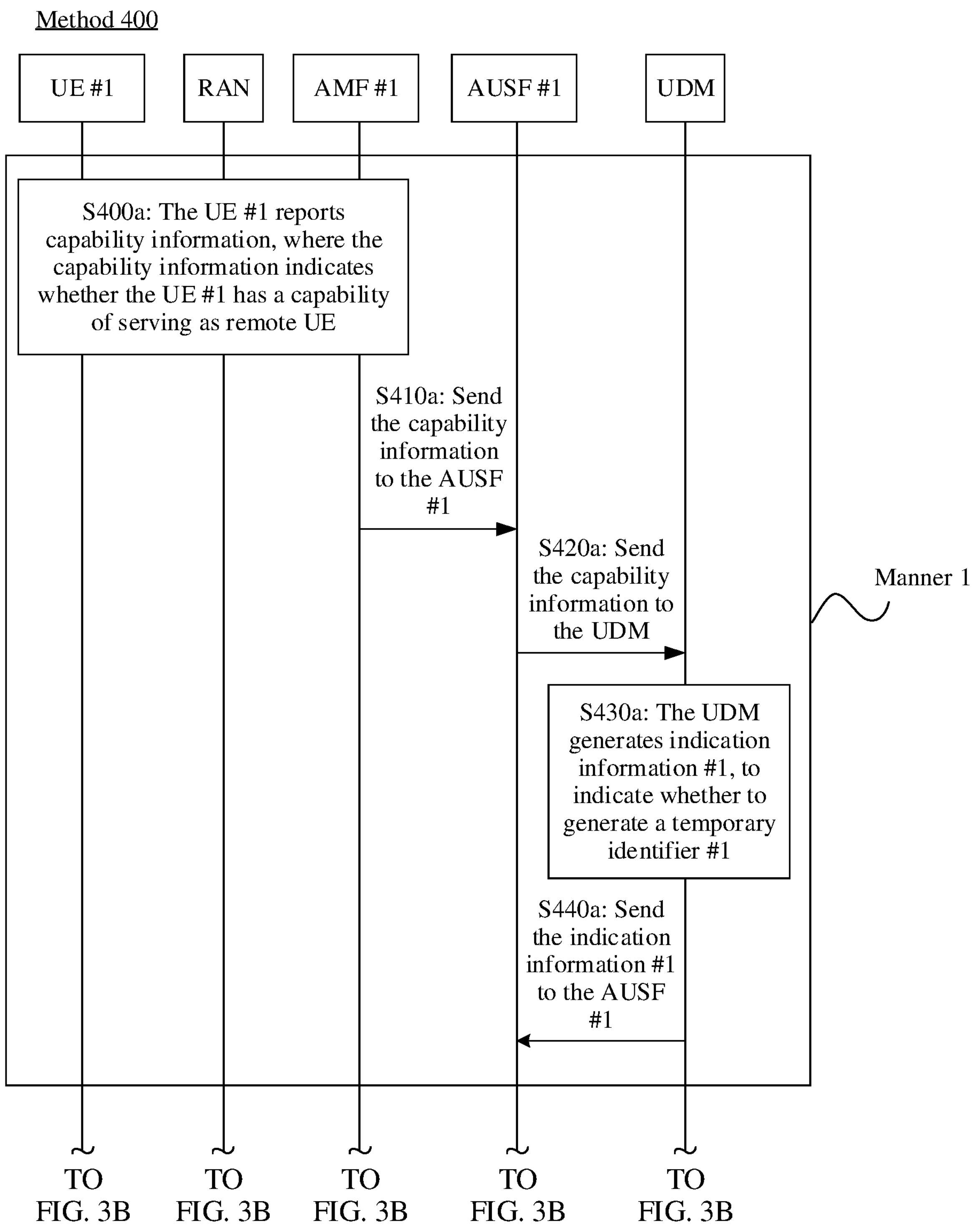
FIG. 3A to FIG. 3C are a schematic interaction flowchart of an example of a method for deriving a temporary identifier of remote user equipment by a network side according to an embodiment of this application.
Figure 3B:
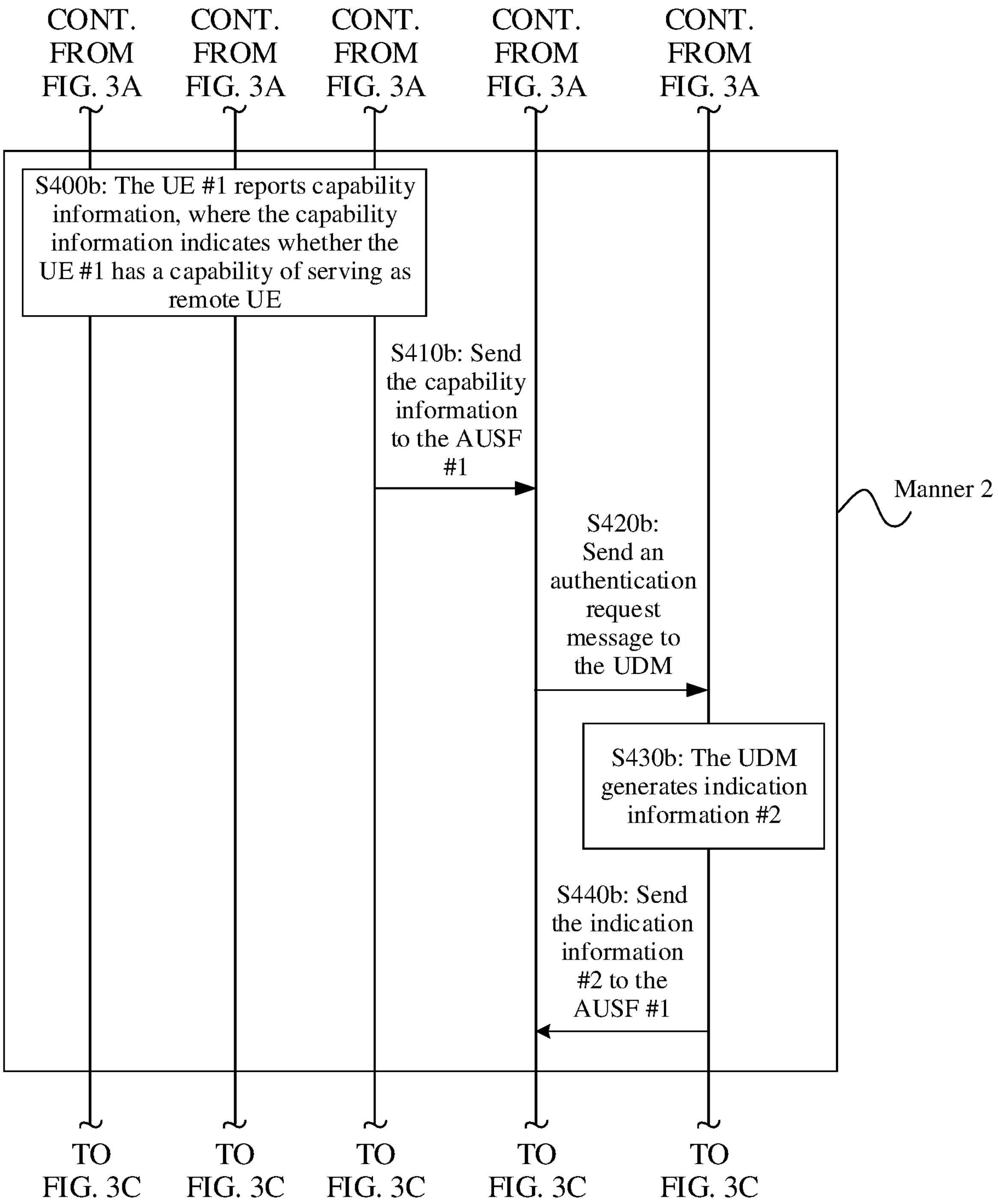
Figure 3C:
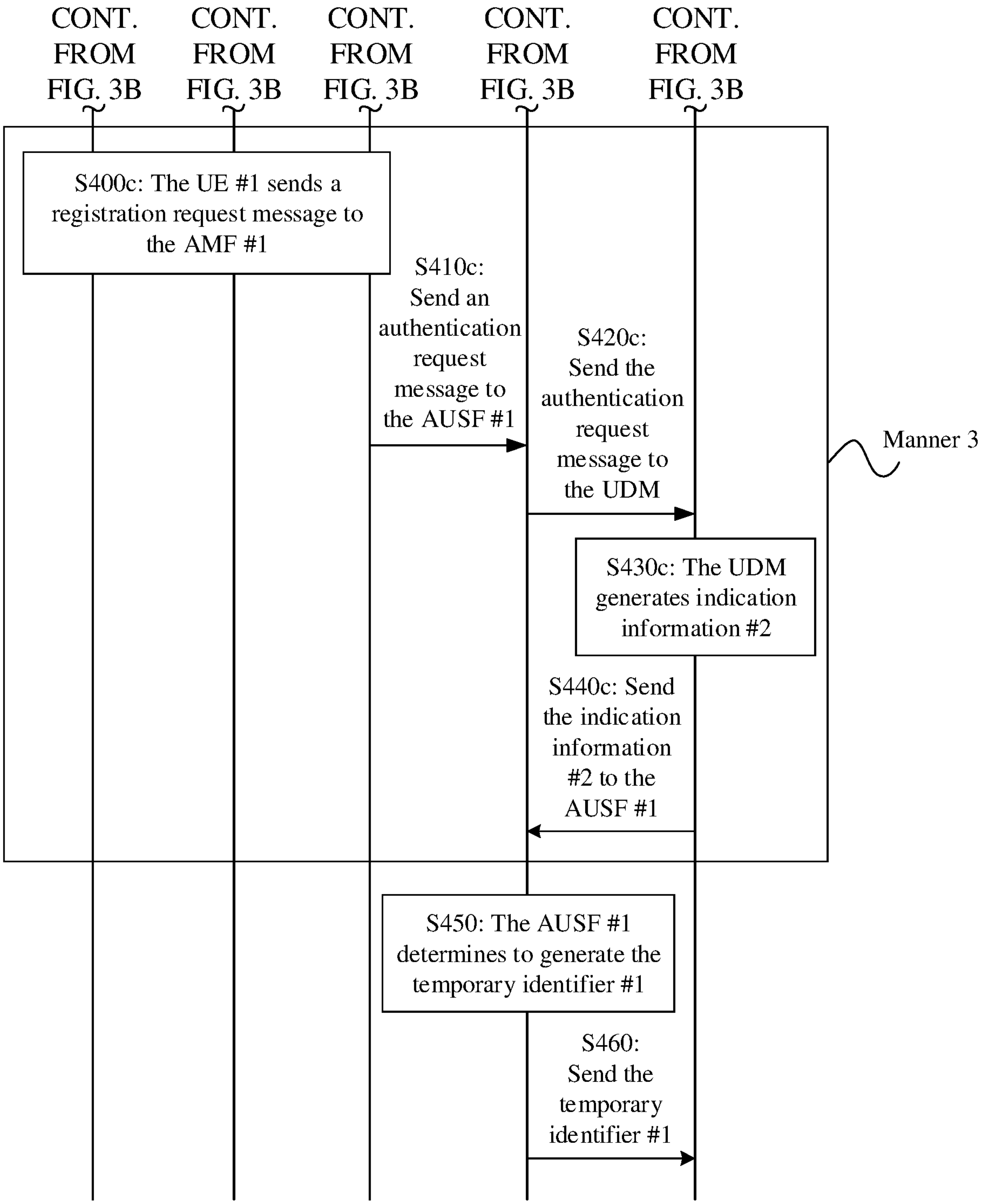

FIG. 3A to FIG. 3C are a schematic flowchart in which a network side derives a temporary identifier of remote UE #1

(namely, an example of first user equipment) in or after an authentication procedure of the UE #1 according to an embodiment of this application. The following steps are included.

In this procedure, a UDM generates indication information, and sends the indication information to an AUSF #1. For example, the following implementations may be listed.

Manner 1: The following S400*a* to S440*a* are included.

S400*a*: The UE #1 reports capability information to an AMF #1, where the capability information indicates whether the UE #1 can support to act as remote UE.

For example, the capability information reported by the UE side to the network side may be carried in a non-access stratum NAS message (for example, a registration request message) sent by the UE #1 to the AMF #1 (namely, an example of a fourth network element).

S410*a*: The AMF #1 sends the capability information of the UE #1 to the AUSF #1.

For example, the capability information of the UE #1 sent by the AMF #1 to the AUSF #1 may be carried in an authentication request message (for example, Nausf_UEAuthentication_Authenticate Request) sent by the AMF #1 to the AUSF #1.

S420*a*: The AUSF #1 receives the capability information sent in S410, and sends the capability information to the UDM (namely, an example of a third network element).

For example, the AUSF #1 may send, to the UDM, an authentication request message (for example, a Nudm_UEAuthentication Request message) including the capability information of the UE #1.

S430*a*: The UDM generates indication information #1 based on the capability information and subscription data of the UE #1, where the indication information #1 indicates whether to generate information that is of the UE #1 and that is used for proximity-based services communication. For example, the information is used to identify the UE #1.

It should be understood that, for ease of description, the following embodiments provide descriptions by using an example in which a temporary identifier #1 (namely, an example of a first temporary identifier) is used as the information that is of the UE #1 and that is used for proximity-based services communication. However, this is not limited in this embodiment of this application.

As an embodiment instead of a limitation, the UDM may obtain the subscription information of the UE #1 based on the authentication request message carrying the capability information, and determine the indication information #1 based on the subscription data of the UE #1 and the capability information of the UE #1.

That the UDM determines the indication information #1 based on the capability information of the UE #1 and the subscription data of the UE #1 includes:

If the subscription data of the UE #1 indicates that the UE #1 is authorized to serve as the remote UE to communicate with a data network through a UE-to-network relay, and the capability information of the UE #1 indicates that the UE #1 supports to act as the remote UE, the UDM indicates the AUSF #1 to generate the indication information #1. If either of the conditions is not met, the UDM does not send the indication information #1 to the AUSF, or the indication information #1 indicates the AUSF #1 not to generate the temporary identifier #1.

S440*a*: The UDM sends the indication information #1 to the AUSF #1.

For example, the indication information #1 may be carried in an authentication response message (for example, Nudm_UEAuthentication response) sent by the UDM to the AUSF #1 in the authentication procedure, or may be sent after an authentication request procedure.

Manner 2: The following S400*b* to S440*b*, are included.

S400*b* and S410*b* are the same as S400*a* and S410*a*. For brevity, details are not described herein again.

S420*b*: The AUSF #1 sends an authentication request message to the UDM, where the authentication request message is the same as or similar to that in the conventional technology.

S430*b*: The UDM obtains subscription data of the UE #1 based on the authentication request message to generate indication information #2, where the indication information #2 indicates whether the UE #1 is authorized to serve as the remote UE.

S440*b*: The UDM sends the indication information #2 to the AUSF #1.

For example, the indication information #2 may be carried in an authentication response message (for example, Nudm_UEAuthentication response) sent by the UDM to the AUSF #1 in the authentication procedure, or may be sent after the authentication procedure.

Manner 3: The following S400*c* to S440*c* are included.

S400*c*: The UE #1 sends a registration request message to an AMF #1, where the registration request message is the same as or similar to that in the conventional technology.

S410*c*: The AMF #1 sends an authentication request message to the AUSF #1, where the authentication request message is the same as or similar to that in the conventional technology.

S420*c* to S440*c* are the same as S420*b* to S440*b*, and details are not described herein again.

S450: The AUSF #1 determines, based on any one of the following three cases, to generate a temporary identifier #1:

The case 1 corresponds to the manner 1, where the AUSF #1 receives the indication information #1, and the indication information #1 indicates to generate the temporary identifier #1.

The case 2 corresponds to the manner 2, where the AUSF #1 receives the capability information and the indication information #2, and both the capability information and the indication information #2 indicate that the UE #1 supports to act as the remote UE.

The case 3 corresponds to the manner 3, where the AUSF #1 receives the indication information #2, and the indication information #2 indicates that the UE #1 is authorized to serve as the remote UE.

In a process of generating the temporary identifier #1, the temporary identifier #1 may be generated based on a key #1 (namely, an example of a first key) and a network identifier of the remote UE #1. For example, the following implementations may be listed.

In an implementation, the AUSF #1 generates the temporary identifier #1 based on the network identifier that is of the remote UE #1 and that is sent by the AMF #1 in the authentication procedure and the key #1 generated by the AUSF #1 in the authentication procedure. An algorithm used in the generation process may be the same as or similar to that in the conventional technology. To avoid repetition, details are not described.

In another implementation, the AUSF #1 splices the temporary identifier #1 (namely, an example of a second temporary identifier) and routing information of the UDM to obtain a temporary identifier #1' (namely, another example of the first temporary identifier).

The network identifier of the remote UE may be listed below: a subscription permanent identifier (SUPI), an international mobile subscriber identity (IMSI), or a generic public subscription identifier (GPSI).

The routing information may be listed below: a routing indicator.

It should be understood that, in this embodiment of this application, the AUSF #1 may store the temporary identifier #1 and a correspondence between the temporary identifier #1 and the key #1. Alternatively, the AUSF #1 may not store the temporary identifier #1, but may store a correspondence between the network identifier of the remote UE #1 and the key #1.

The key #1 may be a key generated in the authentication procedure of the UE #1 or a key obtained through derivation based on an intermediate key generated in the authentication procedure.

For example, the key #1 may be a key Kausf #1 generated in the authentication procedure, or may be a key Kpru #1 obtained through derivation based on the Kausf #1.

As an embodiment instead of a limitation, that the AUSF #1 splices the temporary identifier #1 and the routing information of the UDM to obtain the temporary identifier #1' includes the following implementations.

In a possible implementation, the temporary identifier #1 may be indicated by X bits. Y most significant bits indicate the routing information, and remaining (X-Y) least significant bits indicate the temporary identifier #1', where X and Y are positive integers.

In another possible implementation, the temporary identifier #1 may be indicated by X bits. Y least significant bits indicate the routing information, and remaining (X-Y) most significant bits indicate the temporary identifier #1', where X and Y are positive integers.

It should be understood that, after generating the temporary identifier #1, the AUSF #1 may further generate the key obtained through derivation based on the intermediate key generated in the authentication procedure, for example, the Kpru #1. This is not limited in this embodiment of this application.

S460: The AUSF sends the temporary identifier #1 to the UDM.

Specifically, the AUSF #1 sends the temporary identifier #1 and the network identifier of the remote UE #1 to the UDM, and the UDM stores the temporary identifier #1 in context information of the remote UE #1 based on the network identifier of the remote UE #1.

The context of the UE further includes an identifier of the AUSF.

Figure 4A:
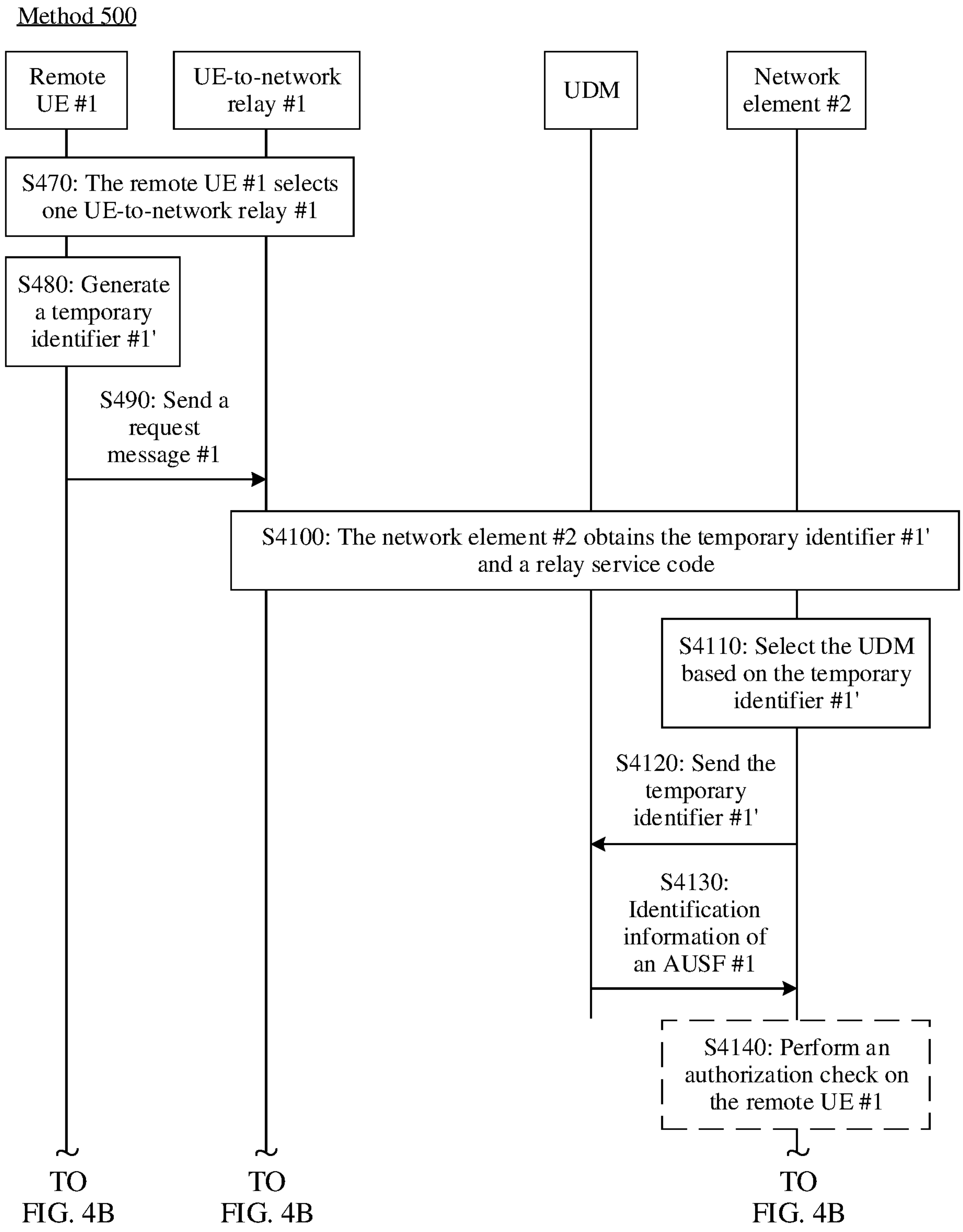
FIG. 4A and FIG. 4B are a schematic interaction flowchart of an example of a method for accessing a network by remote user equipment through a UE-to-network relay according to an embodiment of this application.
Figure 4B:
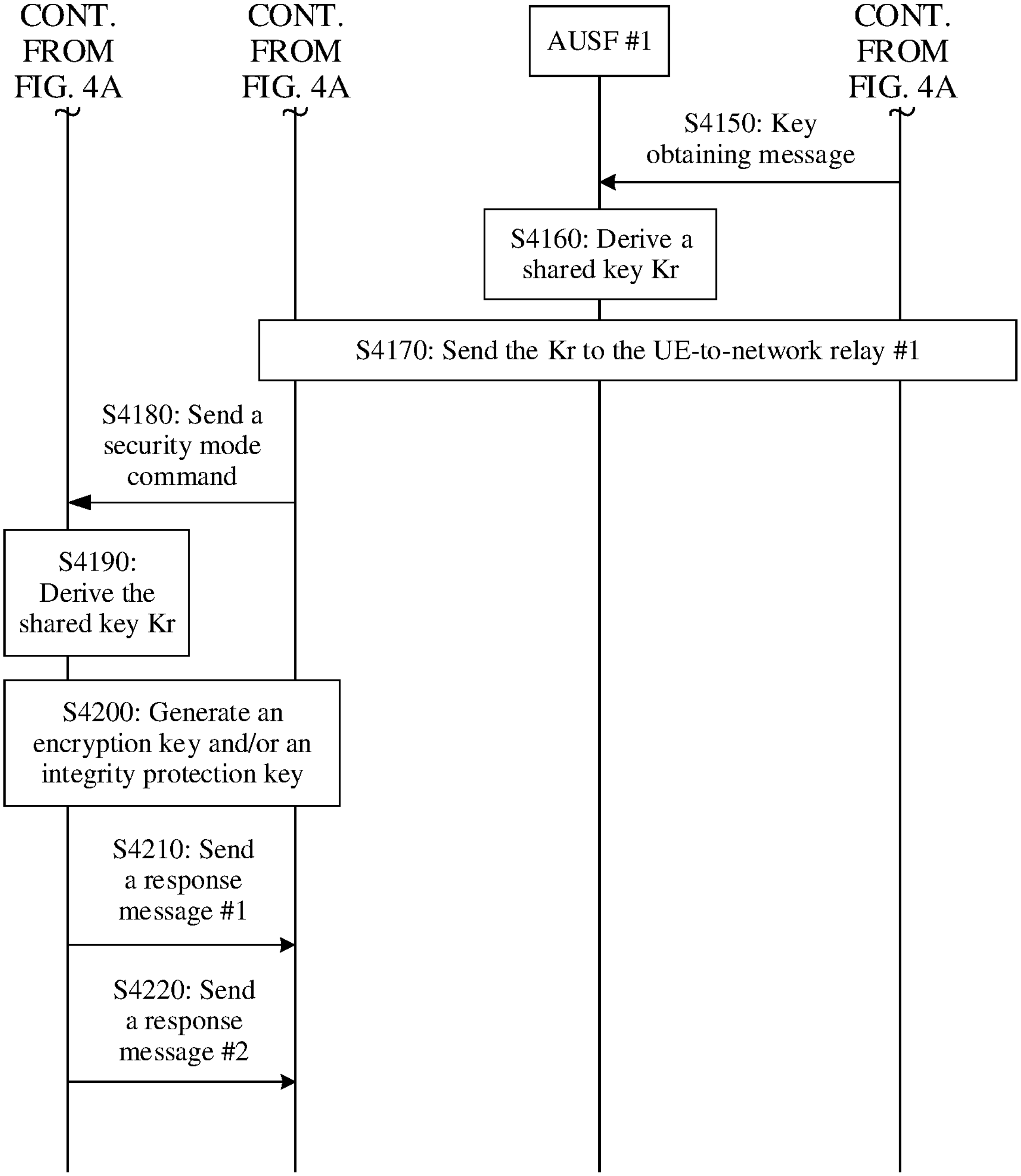
Figure 5A:
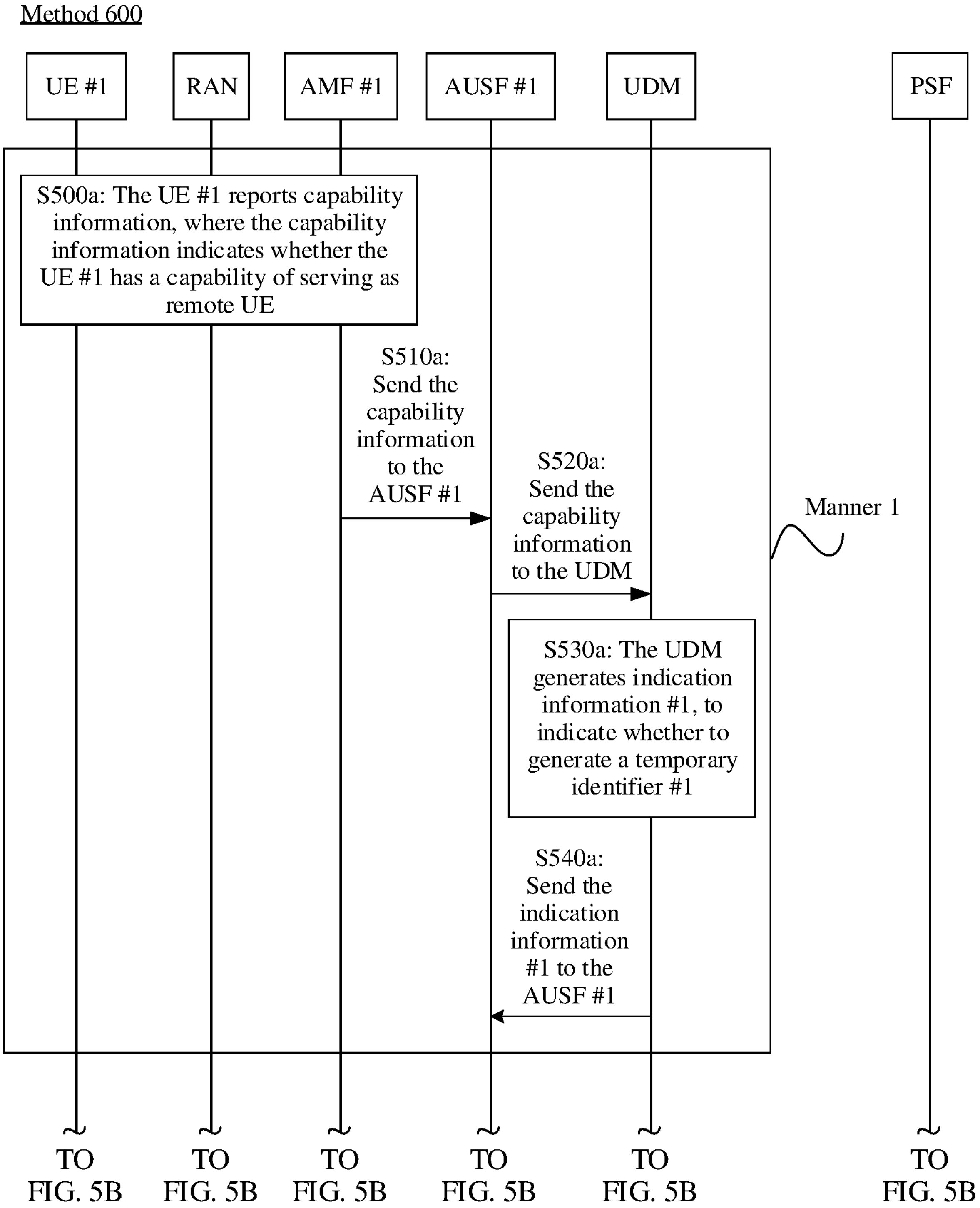
FIG. 5A to FIG. 5D are a schematic interaction flowchart of another example of a method for deriving a temporary identifier of remote user equipment by a network side according to an embodiment of this application.
Figure 5B:
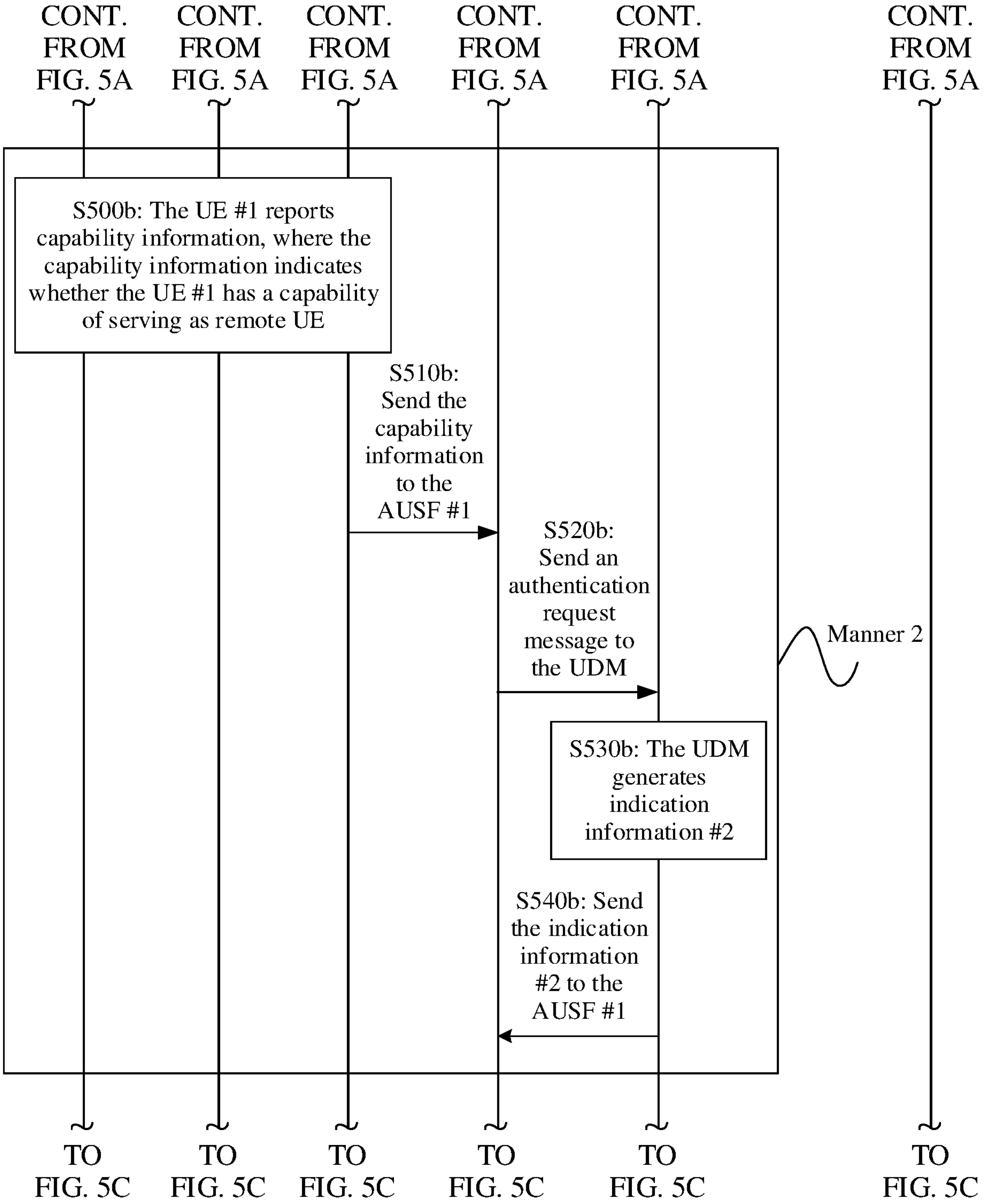
Figure 5C:
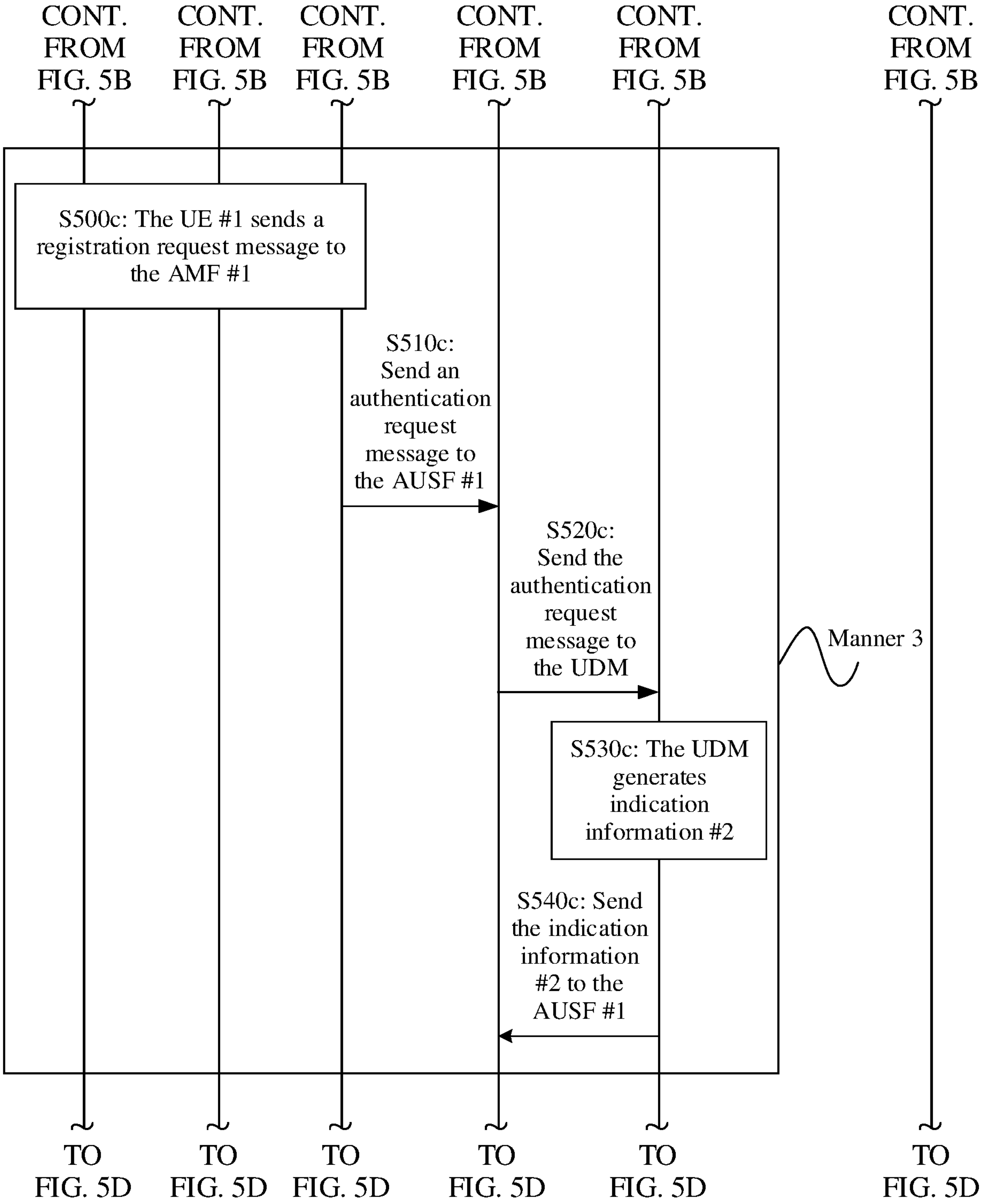
Figure 5D:
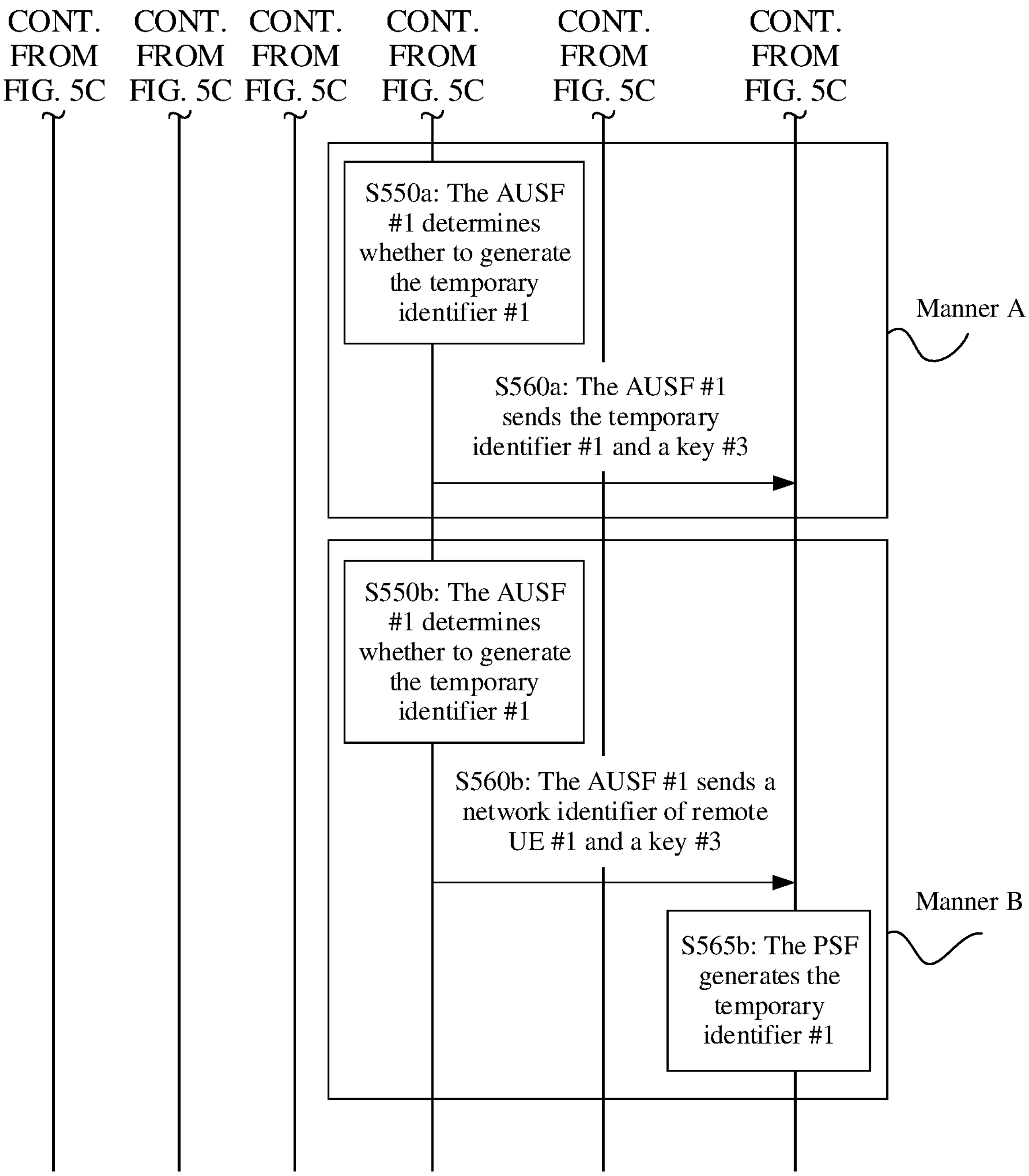

FIG. 4A and FIG. 4B are a schematic flowchart of a phase in which remote UE #1 accesses a network through a UE-to-network relay #1 (namely, an example of second user equipment) according to an embodiment of this application. The following steps are included.

S470: The remote UE #1 finds one or more UE-to-network relays, and selects one UE-to-network relay (which is marked as the UE-to-network relay #1, namely, the example of the second user equipment) from the one or more UE-to-network relays to perform communication. A manner in which the remote UE #1 selects the UE-to-network relay #1 is the same as or similar to that in the conventional technology. This is not limited in this embodiment of this application.

S480: The remote UE #1 generates a temporary identifier #1' (namely, an example of a first temporary identifier).

A manner in which the remote UE #1 generates the temporary identifier #1' is the same as the manner in which the AUSF generates the temporary identifier #1' in S450. To be specific, the remote UE #1 splices a temporary identifier #1 and routing information of a UDM to obtain the temporary identifier #1'. To avoid repetition, details are not described herein again.

S490: The remote UE #1 sends a request message #1 (namely, an example of a first request) to the UE-to-network relay #1, where the request message #1 is used to request to establish a communication connection between the remote UE #1 and the UE-to-network relay #1; for example, the request message is a direct communication request (DCR) message; and the request message #1 includes the temporary identifier #1' and a relay service code.

It should be understood that the relay service code may be preconfigured on the UE side, or may be sent by a network side to the UE. For example, a UE configuration update procedure defined in TS 23.502 is used.

The relay service code is used to identify a connection service provided by the UE-to-network relay supporting a ProSe service, and identify an authorized user served by the UE-to-network relay supporting the ProSe service, and may be used to select a related security policy or related information.

In a possible implementation, the request message #1 may further include a freshness parameter #1 (namely, an example of a first freshness parameter).

In another possible implementation, the request message #1 may further include a message authentication code for integrity (MAC-I) (which is marked as a MAC-I #1).

Specifically, the remote UE #1 uses the relay service code as an input parameter, and generates a key #A based on the key #1 according to a specific algorithm. After the remote UE #1 encrypts the temporary identifier #1' and the relay service code by using the key #A, the MAC-I #1 is generated. The MAC-I #1 is used to verify integrity protection of the request message #1, to prevent the request message #1 from being tampered with by an attacker.

As an embodiment instead of a limitation, in the following S4100 to S4130 and S4150, a network element #2 (namely, a second network element) may be a PSF #1, an AMF #2, or an AUSF #2.

It should be understood that the AMF #2 may be an AMF same as the AMF #1, or may be an AMF different from the AMF #1.

The AMF #1 may be an AMF serving the remote UE #1, and the AMF #2 may be an AMF serving the UE-to-network relay #1.

It should be understood that the AUSF #2 may be an AUSF same as the AUSF #1, or may be an AUSF different from the AUSF #1.

The AUSF #1 may be an AUSF serving the remote UE #1, and the AUSF #2 may be an AUSF serving the UE-to-network relay #1.

It should be understood that the AMF #2 may be an AMF same as the AMF #1, or may be an AMF different from the AMF #1.

For example, the AMF #1 may be an AMF serving the remote UE #1, and the AMF #2 may be an AMF serving the UE-to-network relay #1.

S4100: The UE-to-network relay #1 sends the temporary identifier #1' and the relay service code to the network element #2.

In a possible implementation, information obtained by the network element #2 may further include the freshness parameter #1.

In another possible implementation, information obtained by the network element #2 may further include the MAC-I #1.

This is not limited in this embodiment of this application.

S4110: The network element #2 determines the corresponding UDM based on the routing information in the temporary identifier #1'.

S4120: The network element #2 sends the temporary identifier #1' to the UDM.

S4130: The UDM determines the temporary identifier #1 based on the temporary identifier #1', obtains a network identifier of the remote UE #1 from the correspondence that is between the temporary identifier #1 and the network identifier of the remote UE #1 and that is stored by the UDM in S460, then obtains an identifier of the AUSF #1 from context information of the remote UE #1 based on the network identifier of the remote UE #1, and sends the identifier of the AUSF #1 to the network element #2.

In a possible implementation, information sent to the network element #2 may further include the network identifier of the remote UE #1.

Specifically, in this step, that the UDM obtains the identifier of the AUSF #1 from the context information of the remote UE #1 includes:

The UDM searches the context information of the remote UE #1 for an instance ID of the AUSF #1, and the network element #2 finds the AUSF #1 based on the instance ID.

Optionally, in S4140, if the network element #2 is a PSF, the PSF performs an authorization check on the remote UE #1.

Specifically, the PSF stores authorization information corresponding to each UE to perform the authorization check. The PSF checks, based on the network identifier of the remote UE #1, whether the remote UE #1 is authorized to serve as the remote UE, to obtain, through the UE-to-network relay #1, the connection service corresponding to the relay service code. If the authorization check succeeds, the following steps continue to be performed. If the authorization check fails, the PSF sends a failure response message to the AUSF #2, where the response message includes a cause value of an authorization failure (for example, the authorization check fails, or a necessary parameter is unavailable).

S4150: The network element #2 sends a key obtaining message to the AUSF #1.

In a possible implementation, the key obtaining message includes the temporary identifier #1' (namely, an example of an identifier of the first user equipment) and the relay service code.

In another possible implementation, if the network element #2 in S4130 obtains the network identifier of the remote UE #1 (namely, an example of an identifier of the first user equipment) sent by the UDM, the key obtaining message includes the network identifier of the remote UE #1 and the relay service code.

In a possible implementation, the key obtaining message may further include the freshness parameter #1.

In another possible implementation, the key obtaining message may further include the MAC-I #1.

S4160: The AUSF #1 determines a shared key (for example, Kr) between the remote UE #1 and the UE-to-network relay #1 based on a key #2 (namely, an example of a second key), the relay service code, and at least one freshness parameter.

In a possible implementation, the AUSF #1 obtains the temporary identifier #1' sent by the network element #2 in S4150, and in S450, the AUSF #1 stores the correspondence between the temporary identifier #1 and the key #1. In this case, the AUSF #1 determines the temporary identifier #1 based on the temporary identifier #1', and finds the key #1 based on the correspondence between the temporary identifier #1 and the key #1.

In another possible implementation, the AUSF #1 obtains the network identifier of the remote UE #1 sent by the network element #2 in S4150, and in S450, the AUSF #1 stores the correspondence between the network identifier of the remote UE #1 and the key #1. In this case, the AUSF #1 finds the key #1 based on the network identifier of the remote UE #1 and the correspondence.

The key #2 is a key generated in the authentication procedure or a key obtained through derivation based on the intermediate key generated in the authentication procedure. For example, the following three cases may be listed.

Case 1: The key #2 is the same as the key #1, and the key #2 and the key #1 each are a key Kausf generated in the authentication procedure or a key obtained through derivation based on the Kausf.

Case 2: The key #2 is different from the key #1, the key #1 is a key Kausf generated in the authentication procedure, and the key #1 is a key obtained through derivation based on the Kausf.

Case 3: The key #2 is different from the key #1, the key #2 is a key Kausf generated in the authentication procedure, and the key #1 is a key obtained through derivation based on the Kausf.

It should be understood that, if the Kpru #1 is generated and used in S450, the key #2 in this step is the Kpru #1. If the Kpru #1 is not generated or used in S450, the key #2 in this step may be the Kausf #1, or may be the Kpru #1 generated and used in this step.

Implementations of the at least one freshness parameter may be listed below.

In a possible implementation, the at least one freshness parameter may be the freshness parameter #1 (namely, the freshness parameter #1 generated by the remote UE) sent in S4150.

In another possible implementation, the at least one freshness parameter may be a freshness parameter #2 (namely, an example of a second freshness parameter) generated by the AUSF #1.

In another possible implementation, the at least one freshness parameter may be the freshness parameter #1 generated by the remote UE #1 and a freshness parameter #2 generated by the AUSF #1.

A quantity of freshness parameters is not limited in this embodiment of this application.

It should be understood that, if information received in S4150 includes the MAC-I #1, the AUSF #1 verifies message integrity based on the MAC-I #1, the relay service code, and the temporary identifier #1. A verification manner is consistent with the method in which the remote UE #1 generates the MAC-I #1 in S480. The AUSF #1 uses the relay service code as the input parameter, and generates the key #A based on the key #1 according to the specific algorithm. After the remote UE #1 encrypts the temporary identifier #1 and the relay service code by using the key #A, a MAC-I #1' is generated. If the MAC-I #1 is inconsistent with the MAC-I #1', it indicates that information content is lost or attacked in a transmission process. If the MAC-I #1 is consistent with the MAC-I #1', the shared key is derived.

In a possible implementation, the input parameter for generating the key #A may further include the freshness parameter #1.

S4170: The AUSF #1 sends the shared key to the network element #2, and the network element #2 sends the shared key to the UE-to-network relay #1.

The network element #2 may send the shared key to the UE-to-network relay #1 in the following implementations.

In a possible implementation, the network element #2 sends the shared key to the UE-to-network relay #1 through a user plane.

In another possible implementation, the network element #2 sends the shared key to the UE-to-network relay #1 through a signaling plane.

It should be understood that the shared key may be forwarded to the UE-to-network relay #1 through one or more other network elements.

It should be understood that, if the at least one freshness parameter in S4160 includes the freshness parameter #2, in this step, the AUSF #1 sends the freshness parameter #2 to the UE-to-network relay #1.

S4180: The UE-to-network relay #1 sends a security mode command to the remote UE #1.

The security mode command includes a security algorithm, and the security algorithm may include an encryption algorithm and/or an integrity protection algorithm.

In a possible implementation, the security mode command may further include the freshness parameter #2.

S4190: In this step, the remote UE #1 generates the shared key based on the key, the relay service code, and the at least one freshness parameter by using a method the same as that used by the AUSF #1 to generate the shared key in S4160.

S4200: The remote UE #1 and the UE-to-network relay #1 obtain a communication key based on the shared key according to the security algorithm.

The communication key may be obtained in the following implementations.

In a possible implementation, the remote UE #1 and the UE-to-network relay #1 derive an intermediate key or a session key based on the generated shared key, and further derive an encryption key (for example, an NR PC5 Encryption Key, NRPEK) and/or an integrity protection key (for example, an NR PC5 Integrity Key, NRPIK) on each of the signaling plane and the user plane between the remote UE #1 and the UE-to-network relay #1 based on the intermediate key or the session key.

In another possible implementation, the remote UE #1 and the UE-to-network relay #1 separately derive an encryption key and/or an integrity protection key of a message or data between the remote UE #1 and the UE-to-network relay #1 based on the generated shared key.

A specific manner of generating the communication key is the same as or similar to that in the conventional technology, for example, a key generation manner in TS 23.303 and TS 33.536.

S4210: The UE-to-network relay #1 sends a response message #1 to the remote UE #1, to respond to the security mode command in S4180, where the response message #1 indicates that communication security is established.

S4220: The UE-to-network relay #1 sends a response message #2 to the remote UE #1, to respond to the request message #1 in S490, where the response message #2 indicates that direct communication is established.

FIG. 5A to FIG. 5D are a schematic flowchart of a phase in which a network side authorizes UE #1 to serve as remote UE #1 (namely, an example of first user equipment) in an authentication procedure of the UE #1 according to an embodiment of this application. The following steps are included.

Methods in S500*a* to S540*a* in a manner 1 are similar to the methods in S400*a* to S440*a*, methods in S500*b* to S540*b* in a manner 2 are similar to the methods in S400*b* to S440*b*, and methods in S500*c* to S540*c* in a manner 3 are similar to the methods in S400*c* to S440*c*. Details are not described herein again.

A PSF may obtain a key #3 (namely, an example of a third key) and a temporary identifier #1 in the following implementations.

Manner A:

S550*a*: An AUSF #1 generates a temporary identifier #1 and the key #3.

A specific process of generating the temporary identifier #1 is the same as that in S450. To avoid repetition, details are not described herein again.

S560*a*: The AUSF #1 sends the temporary identifier #1 and the key #3 to the PSF, and the PSF stores a correspondence between the temporary identifier #1 and the key #3.

As an embodiment instead of a limitation, the key #3 may be a key obtained through derivation based on an intermediate key generated in the authentication procedure.

For example, the key #3 may be a key Kpru #1 obtained through derivation based on a key Kausf #1 generated in the authentication procedure.

It should be understood that when a key #1 is a key (for example, the Kpru #1) obtained through derivation based on the intermediate key generated in the authentication procedure, the key #1 is the same as the key #3.

Manner B:

S550*b*: An AUSF #1 determines, based on the three cases described in S450, to generate the key #3, and determines that the PSF generates a temporary identifier #1.

S560*b*: The AUSF #1 sends a network identifier of the remote UE #1 and the key #3 to the PSF, to indicate the PSF to generate the temporary identifier #1.

S565*b*: The PSF generates the temporary identifier #1 based on the network identifier of the remote UE #1 and the key #3, where the following implementations may be listed.

In an implementation, the PSF generates the temporary identifier #1 (namely, an example of a first temporary identifier) based on the network identifier of the remote UE #1 and the key #3.

In another implementation, the PSF splices the temporary identifier #1 and routing information of a UDM to obtain a temporary identifier #1' (namely, an example of a second temporary identifier).

It should be understood that, in this embodiment of this application, the PSF stores the temporary identifier #1 and a correspondence between the temporary identifier #1 and the key #3.

Figure 6:
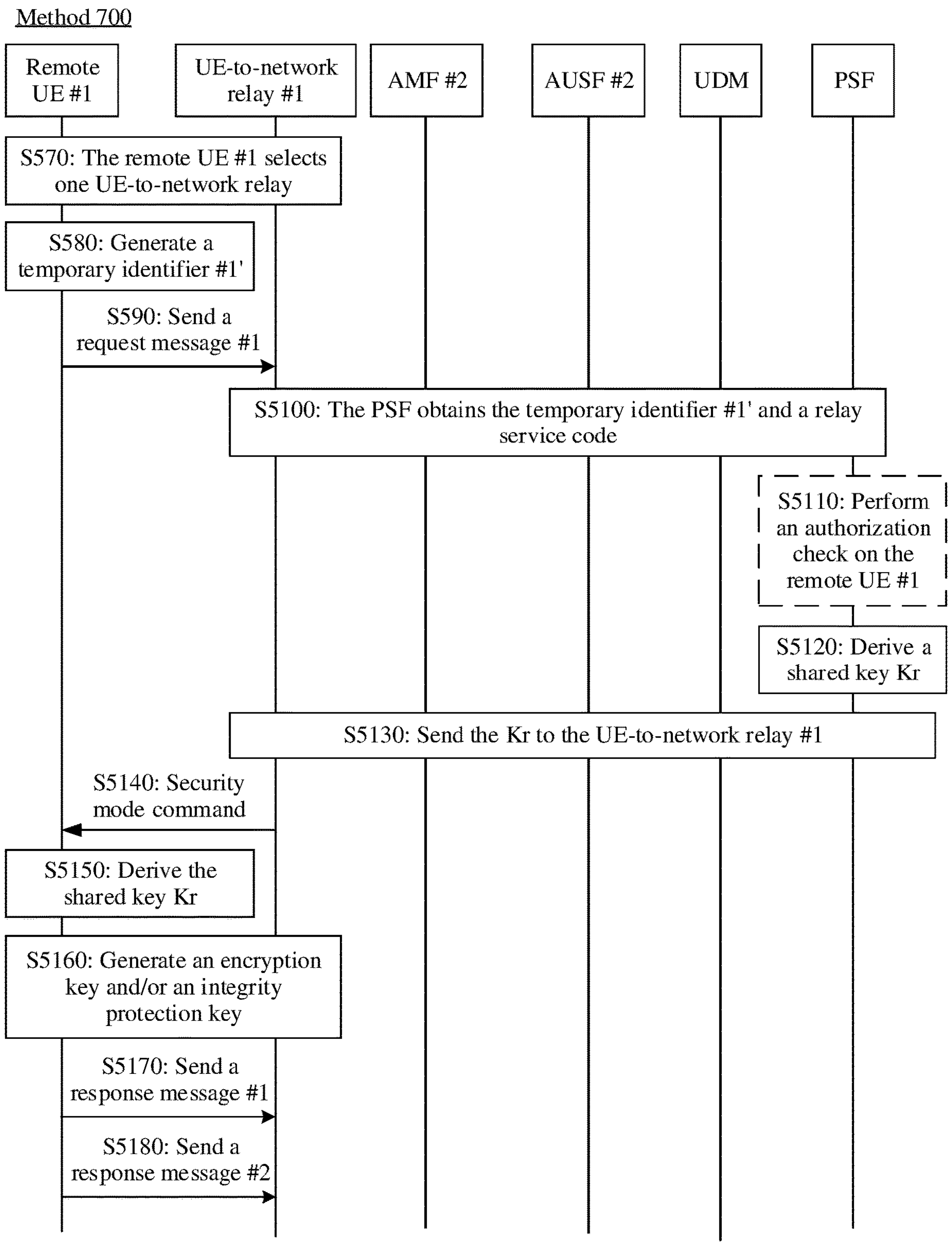
FIG. 6 is a schematic interaction flowchart of another example of a method for accessing a network by remote user equipment through a UE-to-network relay according to an embodiment of this application.
Figure 7A:
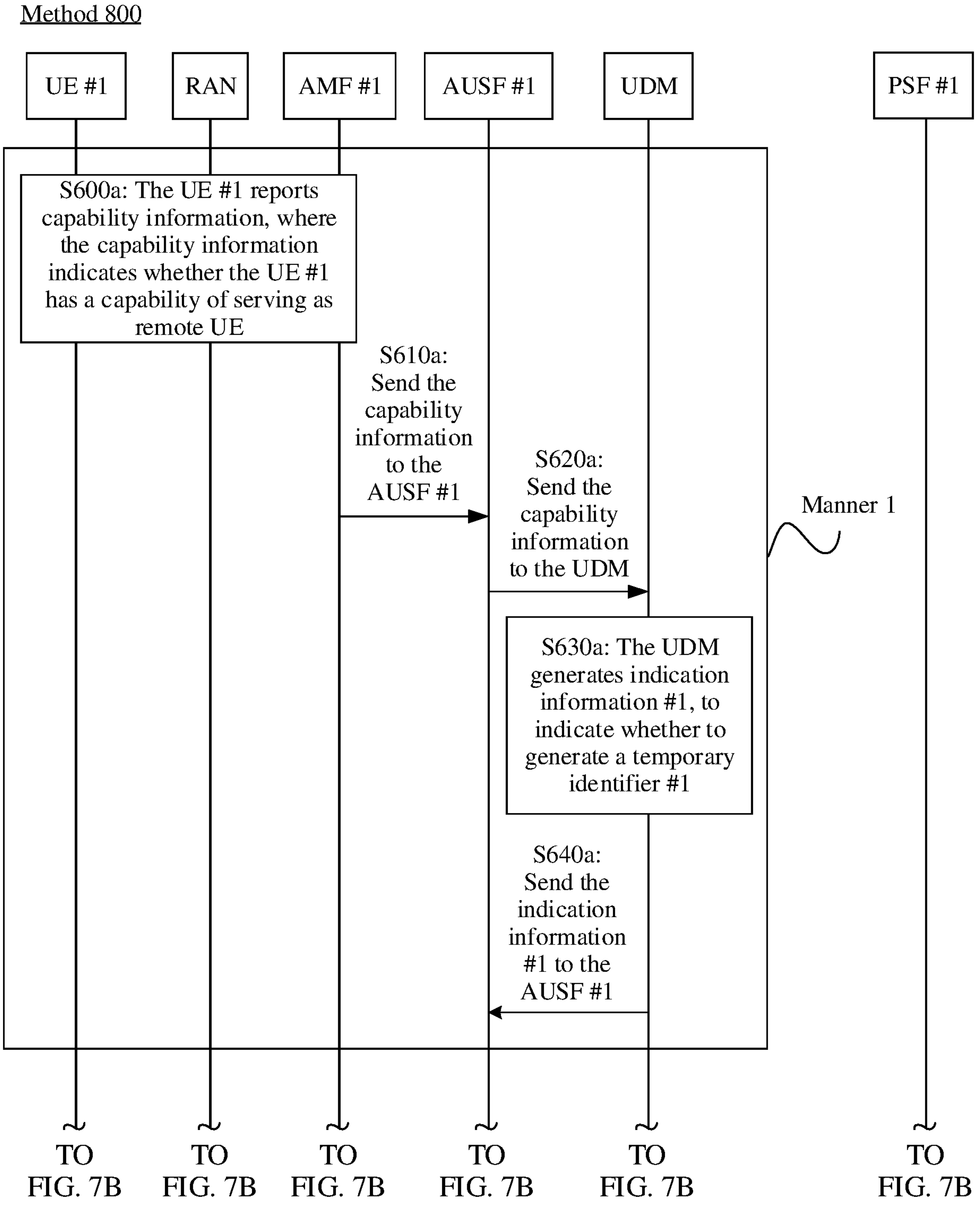
FIG. 7A to FIG. 7D are a schematic interaction flowchart of another example of a method for deriving a temporary identifier of remote user equipment by a network side according to an embodiment of this application.
Figure 7B:
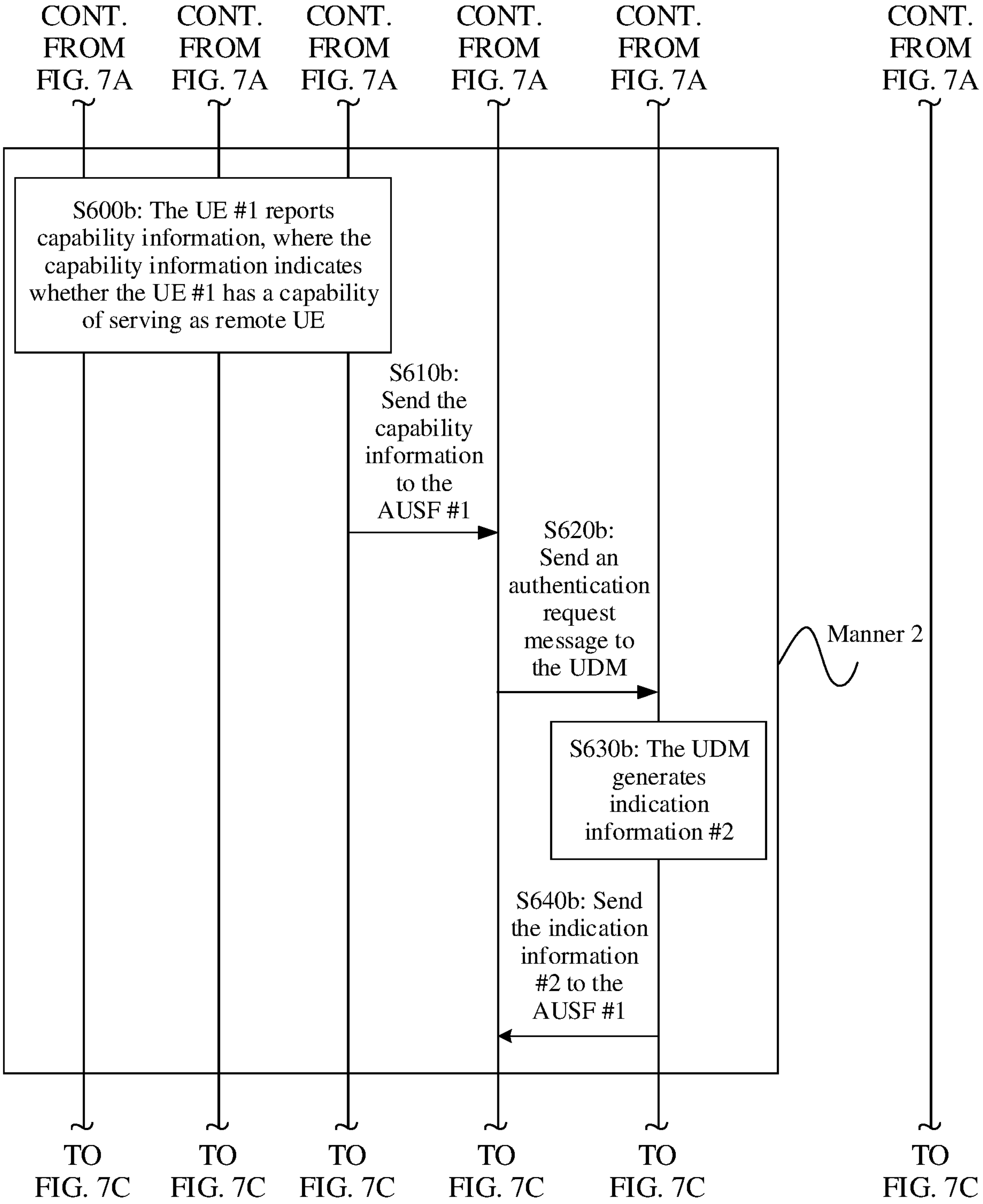
Figure 7C:
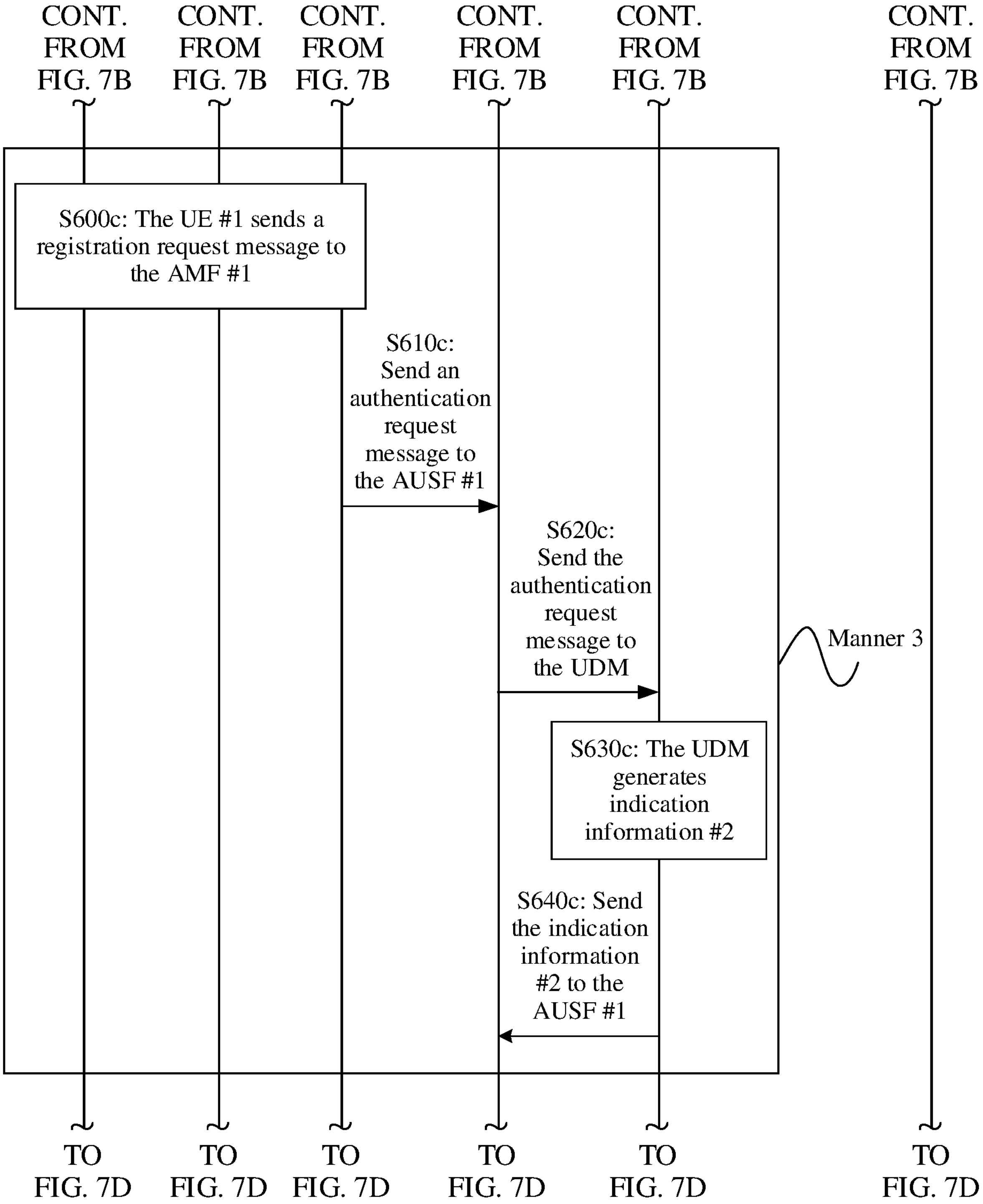
Figure 7D:
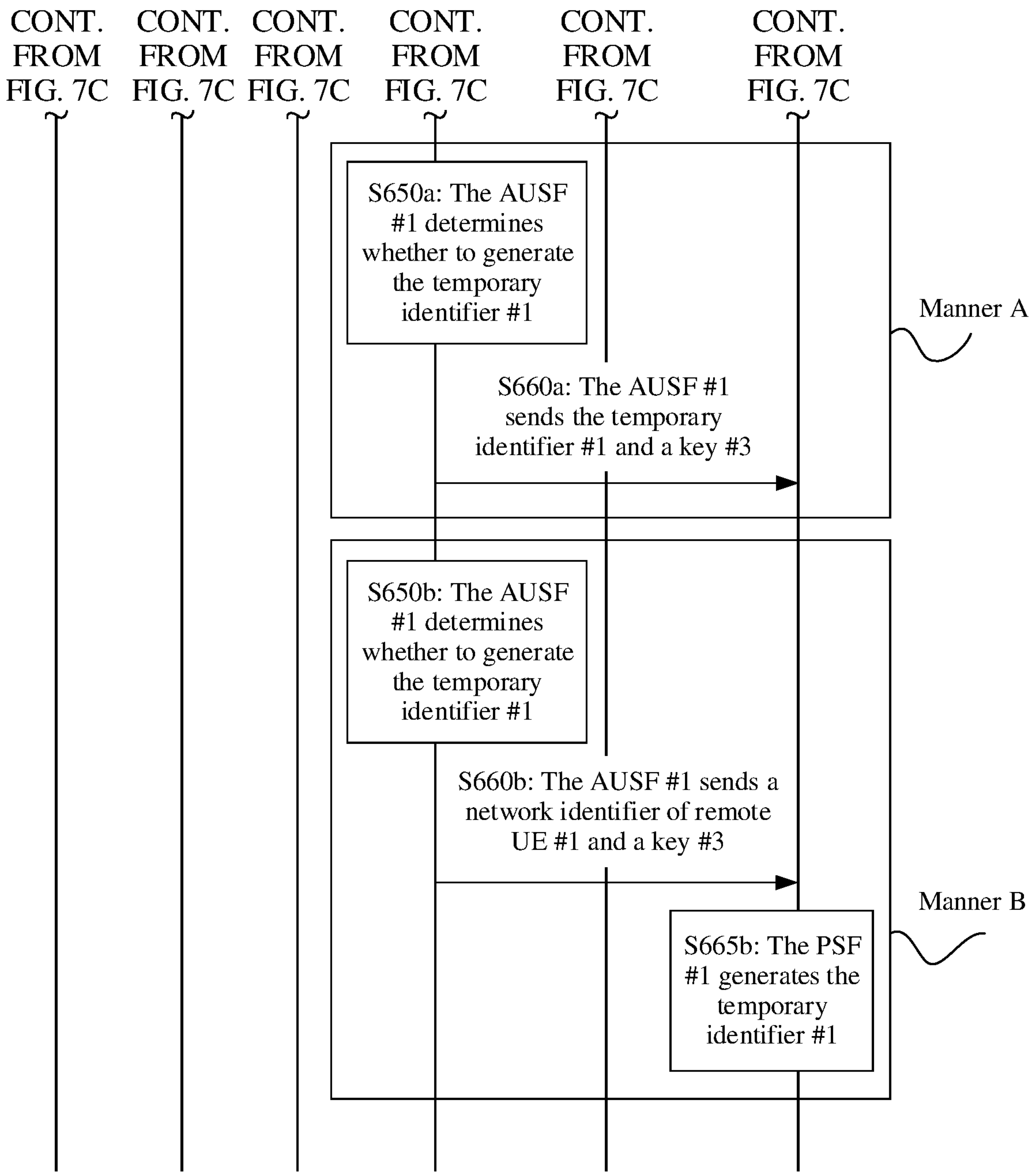
Figure 8A:
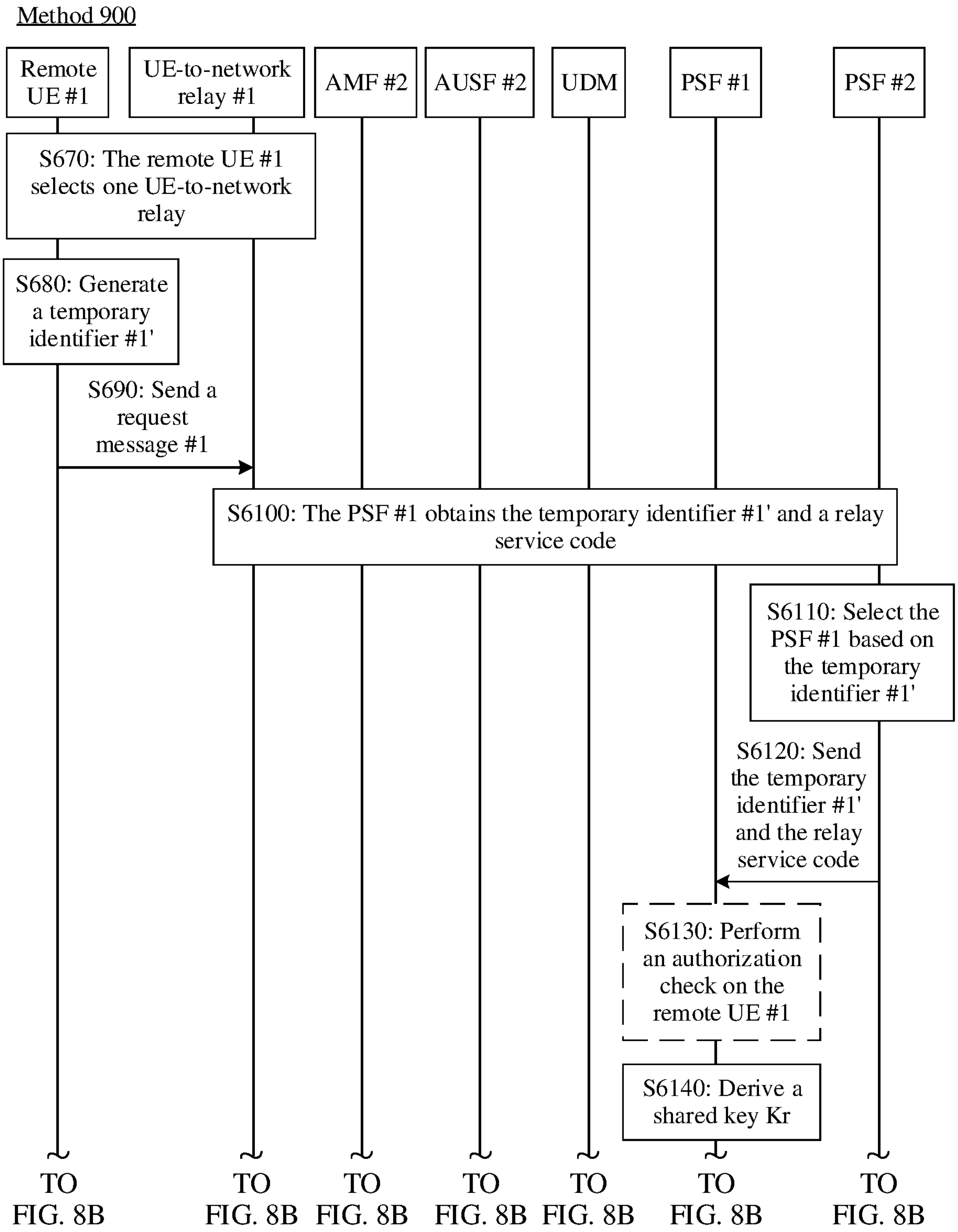
FIG. 8A and FIG. 8B are a schematic interaction flowchart of another example of a method for accessing a network by remote user equipment through a UE-to-network relay according to an embodiment of this application.
Figure 8B:
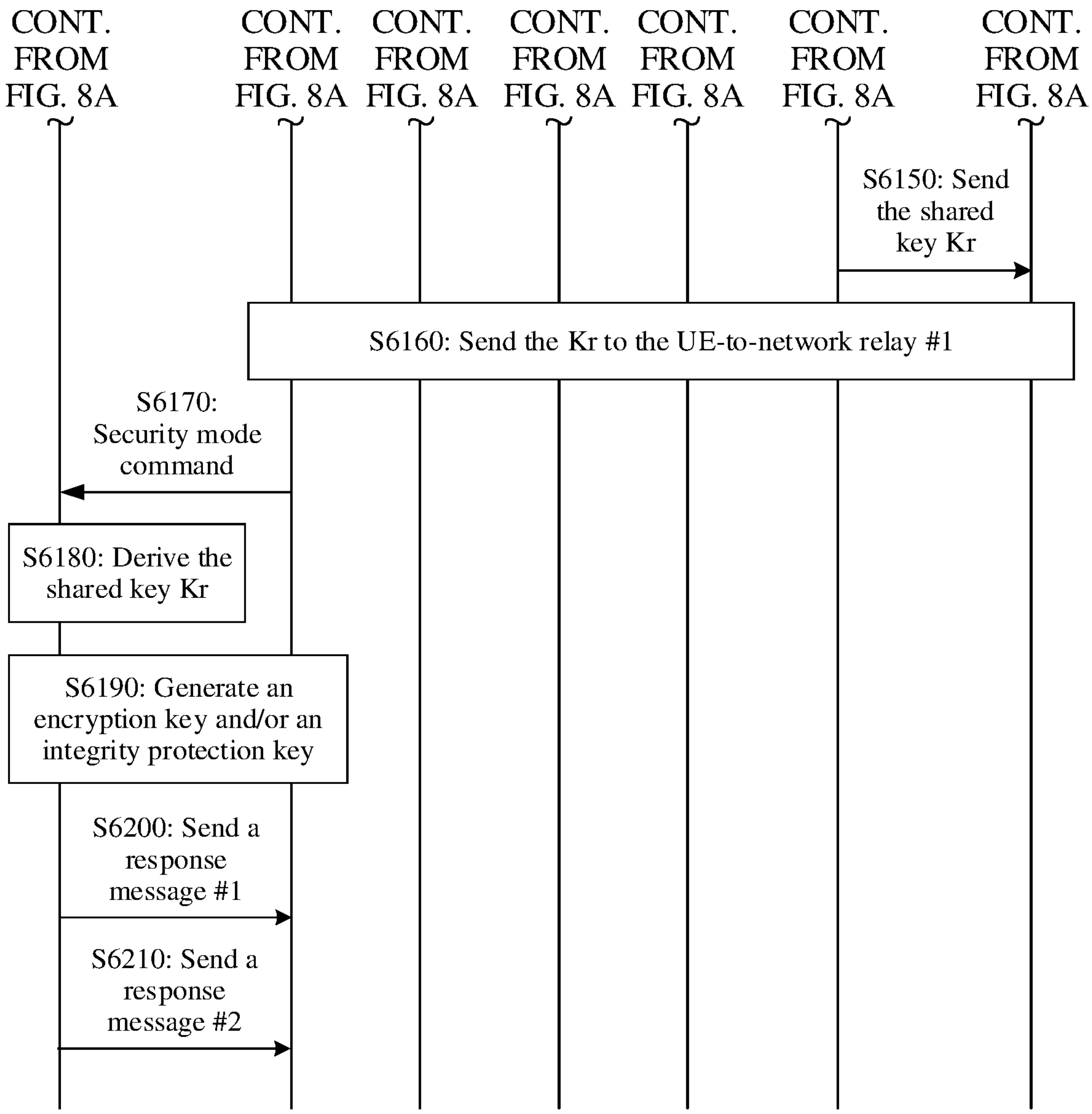

FIG. 6 is a schematic flowchart of a phase in which remote UE #1 accesses a network through a UE-to-network relay according to an embodiment of this application. The following steps are included.

A method in S570 is the same as or similar to the method in S470. In S570, the remote UE #1 finds one or more UE-to-network relays, and selects one UE-to-network relay (which is marked as a UE-to-network relay #1, namely, an example of second user equipment) from the one or more UE-to-network relays to perform communication.

A method in S580 is the same as or similar to the method in S480. In S580, the remote UE #1 generates a temporary identifier #1'.

A manner in which the remote UE #1 generates the temporary identifier #1' is the same as the manner in which the AUSF #1 generates the temporary identifier #1' in S540.

As an embodiment instead of a limitation, the AUSF #1 splices a temporary identifier #1 and routing information of a PSF to obtain the temporary identifier #1' in the following implementations.

In a possible implementation, the temporary identifier #1 may be indicated by X bits. Y most significant bits indicate the routing information, and remaining (X-Y) least significant bits indicate the temporary identifier #1', where X and Y are positive integers.

In another possible implementation, the temporary identifier #1 may be indicated by X bits. Y least significant bits indicate the routing information, and remaining (X-Y) most significant bits indicate the temporary identifier #1', where X and Y are positive integers.

A specific algorithm is the same as or similar to that in the conventional technology, for example, a basic key derivation manner specified in a standard.

It should be understood that a sequence of sequence numbers of S560, S570, and S580 does not indicate a sequence of performing the steps. The sequence of performing the steps is not limited in this embodiment of this application, and a person skilled in the art may flexibly set the sequence based on a requirement.

A method in S590 is the same as or similar to the method in S490. In S590, the remote UE #1 sends a request message #1 (namely, an example of a first request) to the UE-to-network relay #1. The request message #1 is used to request to access the network through the UE-to-network relay #1. For example, the request message is a direct communication request (direct communication request, DCR) message. The request message #1 carries information #2, and the request message #1 includes the temporary identifier #1' and a relay service code.

It should be understood that the relay service code may be preconfigured on the UE side, or may be sent by a network side to the UE. For example, a UE configuration update procedure defined in TS 23.502 is used.

The relay service code is used to identify a connection service provided by the UE-to-network relay supporting a ProSe service, and identify an authorized user served by the UE-to-network relay supporting the ProSe service, and may be used to select a related security policy or related information.

In a possible implementation, the request message #1 may further include a freshness parameter #1.

In another possible implementation, the request message #1 may further include a MAC-I #2.

Specifically, the remote UE #1 uses the relay service code as an input parameter, and generates a key #A based on the key #3 according to a specific algorithm. After the remote UE #1 encrypts the temporary identifier #1' and the relay service code by using the key #A, a message authentication code for integrity (message authentication code for integrity, MAC-I) (which is marked as the MAC-I #2) is generated. The MAC-I #2 is used to verify integrity protection of the request message #1, to prevent the request message #1 from being tampered with by an attacker.

S5100: The UE-to-network relay #1 sends the temporary identifier #1' and the relay service code to the PSF on the network side.

In a possible implementation, information obtained by the PSF from the UE-to-network relay #1 may further include the freshness parameter #1.

In another possible implementation, information obtained by the PSF from the UE-to-network relay #1 may further include the MAC-I #2.

It should be understood that the UE-to-network relay #1 may send the temporary identifier 1' and the relay service code to the PSF through one or more other network elements.

Optionally, a method in S5110 is the same as or similar to the method in S4140. In S5110, the PSF performs an authorization check on the remote UE #1.

Specifically, the PSF stores authorization information corresponding to each UE to perform the authorization check. The PSF checks, based on the temporary identifier #1', whether the remote UE #1 is authorized to serve as the remote UE, to obtain, through the UE-to-network relay #1, the connection service corresponding to the relay service code. If the authorization check succeeds, the following steps continue to be performed. If the authorization check fails, the PSF sends a failure response message to the AUSF #2, where the response message includes a cause value of an authorization failure (for example, the authorization check fails, or a necessary parameter is unavailable).

A method in S5120 is the same as or similar to the method in S4160. In S5120, the PSF determines a shared key (for example, Kr) between the remote UE #1 and the UE-to-network relay #1 based on the key #3, the relay service code, and the at least one freshness parameter.

Specifically, the PSF determines the temporary identifier #1 based on the temporary identifier #1', and searches for the key #3 based on the correspondence that is between the temporary identifier #1 and the key #3 and that is stored in **S560*a* in the manner A or the correspondence that is between the temporary identifier #1 and the key #3 and that is stored in S565*b*** in the manner B.

As an embodiment instead of a limitation, in this step, the key #3 may be a key obtained through derivation based on the intermediate key generated in the authentication procedure.

For example, the key #3 may be a key Kpru #1 obtained through derivation based on a key Kausf #1 generated in the authentication procedure.

Manners of generating the at least one freshness parameter may be listed below.

In a possible implementation, the at least one freshness parameter may be the freshness parameter #1 (namely, the freshness parameter #1 generated by the remote UE) sent in S590.

In another possible implementation, the at least one freshness parameter may be a freshness parameter #2 generated by the PSF.

In another possible implementation, the at least one freshness parameter may be the freshness parameter #1 generated by the remote UE and a freshness parameter #2 generated by the PSF.

A quantity of freshness parameters is not limited in this embodiment of this application.

It should be understood that, if the information obtained by the PSF in S5100 may further include the MAC-I #2, the AUSF #1 verifies message integrity based on the MAC-I #2, the relay service code, and the temporary identifier #1. A verification manner is the same as or similar to the method in S580. The AUSF #1 uses the relay service code as the input parameter, and generates the key #A based on the key #3 according to the specific algorithm. After the remote UE #1 encrypts the temporary identifier #1 and the relay service code by using the key #A, a MAC-I #2' is generated. If the MAC-I #2 is inconsistent with the MAC-I #2', it indicates that information content is lost or attacked in a transmission process. If the MAC-I #2 is consistent with the MAC-I #2', the shared key is derived.

In a possible implementation, the input parameter for generating the key #A may further include the freshness parameter #1.

S5130: The PSF sends the shared key to the UE-to-network relay #1.

In a possible implementation, the PSF sends the shared key to the UE-to-network relay #1 through a user plane.

In another possible implementation, the PSF sends the shared key to the UE-to-network relay #1 through a signaling plane.

It should be understood that the shared key may be forwarded to the UE-to-network relay #1 through one or more other network elements.

It should be understood that, if the at least one freshness parameter in S5120 includes the freshness parameter #2, in this step, the AUSF #2 sends the freshness parameter #2 to the UE-to-network relay #1.

A method in S5140 is the same as or similar to the method in S4180. In S5140, the UE-to-network relay #1 sends a security mode command to the remote UE #1.

The security mode command includes a security algorithm, and the security algorithm may include an encryption algorithm and/or an integrity protection algorithm.

In a possible implementation, the security mode command may further include the freshness parameter #2.

A method in S5150 is the same as or similar to the method in S4190. In S5150, the remote UE #1 generates the shared key based on the key #3, the relay service code, and the at least one freshness parameter by using a method the same as that in S5120.

A method in S5160 is the same as or similar to the method in S4200. In S160, the remote UE #1 obtains a communication key based on the shared key and the security algorithm.

The communication key may be obtained in the following implementations.

In a possible implementation, the remote UE #1 and the UE-to-network relay #1 derive an intermediate key or a session key based on the generated shared key, and further derive an encryption key (for example, an NR PC5 Encryption Key, NRPEK) and/or an integrity protection key (for example, an NR PC5 Integrity Key, NRPIK) on each of the signaling plane and the user plane between the remote UE #1 and the UE-to-network relay #1 based on the intermediate key or the session key.

In another possible implementation, the remote UE #1 and the UE-to-network relay #1 separately derive an encryption key and/or an integrity protection key of a message or data between the remote UE #1 and the UE-to-network relay #1 based on the generated shared key.

A specific manner of generating the communication key is the same as or similar to that in the conventional technology, for example, a key generation manner in TS 23.303 and TS 33.536.

A method in S5170 is the same as or similar to the method in S4210. In S5170, the UE-to-network relay #1 sends a response message #1 to the remote UE #1, to respond to the security mode command in S5160, where the response message #1 indicates that communication security is established.

A method in S5180 is the same as or similar to the method in S4220. In S5180, the UE-to-network relay #1 sends a response message #2 to the remote UE #1, to respond to the request message #1 in S590, where the response message #2 indicates that direct communication is established.

FIG. 7A to FIG. 7D are a schematic flowchart of a phase in which UE #1 is authenticated and authorized to serve as remote UE #1 (namely, an example of second user equipment) according to an embodiment of this application. The following steps are included.

Methods in S600*a* to S640*a* in a manner 1 are similar to the methods in S500*a* to S540*a*, methods in S600*b* to S640*b* in a manner 2 are similar to the methods in S500*b* to S540*b*, and methods in S600*c* to S640*c* in a manner 3 are similar to the methods in S500*c* to S540*c*. Methods in S650*a* and S660*a* in a manner A are similar to the methods in S550*a* and S560*a*, methods in S650*b* to S665*b* in a manner B are similar to the methods in S550*b* to S565*b*, and methods in S670 to S690 are similar to the methods in S570 to S590. Details are not described herein again.

It should be understood that, in the following steps, a PSF #1 (namely, an example of a fifth network element) may be a remote PSF, and a PSF #2 (namely, an example of a sixth network element) may be a PSF that serves a UE-to-network relay #1.

S6100: The UE-to-network relay #1 sends a temporary identifier #1' and a relay service code to the PSF #2.

It should be understood that the UE-to-network relay #1 may send the temporary identifier 1' and the relay service code to the PSF through one or more other network elements.

In a possible implementation, information obtained by the PSF #2 from the UE-to-network relay #1 may further include a freshness parameter #1.

In another possible implementation, information obtained by the PSF #2 from the UE-to-network relay #1 may further include a MAC-I #1.

S6110: The PSF #2 determines a corresponding PSF #1 based on routing information in a temporary identifier #1' (namely, an example of a first temporary identifier).

S6120: The PSF #1 obtains the temporary identifier #1' and the relay service code.

In a possible implementation, information obtained by the PSF #1 may further include the freshness parameter #1.

In a possible implementation, information obtained by the PSF #1 may further include the MAC-I #1.

Optionally, a method in S6130 is the same as or similar to the method in S5110. In S6130, the PSF #1 performs an authorization check on the remote UE #1.

The PSF #1 checks, based on the temporary identifier #1', whether the remote UE #1 is authorized to serve as the remote UE, to obtain, through the UE-to-network relay #1, the connection service corresponding to the relay service code. If the authorization check succeeds, the following steps continue to be performed. If the authorization check fails, the PSF #1 sends a failure response message to the AUSF #2, where the response message includes a cause value of an authorization failure (for example, the authorization check fails, or a necessary parameter is unavailable).

A method in S6140 is similar to the method in S5120. In S6140, the PSF #1 determines a shared key (for example, Kr) between the remote UE #1 and the UE-to-network relay #1 based on the key #3, the relay service code, and at least one freshness parameter. To avoid repetition, details are not described herein again.

It should be understood that, if the information obtained by the PSF #1 in S6100 further includes the MAC-I #1, the AUSF #1 verifies message integrity based on the MAC-I #1, the relay service code, and the temporary identifier #1 (namely, an example of the first temporary identifier). A verification manner is the same as or similar to the method in S5120, and details are not described herein again.

S6150: The PSF #1 sends the shared key to the PSF #2.

In a possible implementation, the PSF #1 sends the shared key to the UE-to-network relay #1 through a user plane.

In another possible implementation, the PSF #1 sends the shared key to the UE-to-network relay #1 through a signaling plane.

It should be understood that the shared key may be forwarded to the UE-to-network relay #1 through one or more other network elements.

It should be understood that, if the at least one freshness parameter in S6140 includes the freshness parameter #2, in this step, the PSF #1 sends the freshness parameter #2 to the PSF #2.

A method in S6160 is the same as or similar to the method in S5130. In S6160, the PSF #2 sends the shared key to the UE-to-network relay #1.

It should be understood that, if the PSF #2 receives the freshness parameter #2 in S6150, the PSF #2 sends the freshness parameter #2 to the UE-to-network relay #1.

A method in S6170 is the same as or similar to the method in S5140. In S6170, the UE-to-network relay #1 sends a security mode command to the remote UE #1.

The security mode command includes a security algorithm, and the security algorithm may include an encryption algorithm and/or an integrity protection algorithm.

In a possible implementation, the security mode command may further include the freshness parameter #2.

A method in S6180 is the same as or similar to the method in S5150. In S6180, the remote UE #1 generates the shared key based on the key #3, the relay service code, and the at least one freshness parameter by using a method the same as that in S6150.

A method in S6190 is the same as or similar to the method in S5160. In S6190, the remote UE #1 obtains a communication key based on the shared key and the security algorithm.

The communication key may be obtained in the following implementations.

In a possible implementation, the remote UE #1 and the UE-to-network relay #1 derive an intermediate key or a session key based on the generated shared key, and further derive an encryption key (for example, an NR PC5 Encryption Key, NRPEK) and/or an integrity protection key (for example, an NR PC5 Integrity Key, NRPIK) on each of the signaling plane and the user plane between the remote UE #1 and the UE-to-network relay #1 based on the intermediate key or the session key.

In another possible implementation, the remote UE #1 and the UE-to-network relay #1 separately derive an encryption key and/or an integrity protection key of a message or data between the remote UE #1 and the UE-to-network relay #1 based on the generated shared key.

A specific manner of generating the communication key is the same as or similar to that in the conventional technology, for example, a key generation manner in TS 23.303 and TS 33.536.

A method in S6200 is the same as or similar to the method in S5170. In 6200, the UE-to-network relay #1 sends a response message #1 to the remote UE #1, to respond to the security mode command in S6190, where the response message #1 indicates that communication security is established.

A method in S6210 is the same as or similar to the method in S5180. In 6210, the UE-to-network relay #1 sends a response message #2 to the remote UE #1, to respond to the request message #1 (namely, an example of a first request) in S690, where the response message #2 indicates that direct communication is established.

It should be understood that, in the foregoing embodiments, the identifier of the first user equipment (that is, including the network identifier of the remote UE and a network identifier of the first user equipment) is used to identify information about the first user equipment. The identifier of the first user equipment is not limited in this embodiment of this application. To achieve an objective of identifying the first user equipment, a person skilled in the art may flexibly limit the identifier of the first user equipment based on a specific case.

It should be understood that, in the foregoing embodiments, sequence numbers of the processes do not indicate an execution sequence. The execution sequence of the processes should be determined according to functions and internal logic of the processes, and should not be construed as any limitation on the implementation processes of embodiments of this application.

In the conventional technology, a process in which remote UE establishes a session with a network through a UE-to-network relay is described below.

The remote UE and the UE-to-network relay separately access a network, and obtain authorization and configuration information from the network. The authorization and configuration information is used to establish a ProSe communication connection. The remote UE finds one or more UE-to-network relays, selects one UE-to-network relay from the one or more UE-to-network relays, and accepts connection service information provided by the UE-to-network relay. The remote UE establishes a one-to-one direct communication connection to the selected UE-to-network relay. The UE-to-network relay reports a remote user equipment report (Remote UE Report) of a relay-related protocol data unit (PDU) session to a session management network element, for example, a remote user identifier (Remote User ID) and remote user information (Remote UE info).

In a process in which the remote user equipment obtains a service through the UE-to-network relay, to ensure communication security, a secure connection needs to be established between the remote UE and the UE-to-network relay. However, the remote UE dynamically establishes the communication connection through the UE-to-network relay as required. For example, the UE-to-network relay found by the remote UE in a finding process is not fixed. For example, the UE-to-network relay #1 may be first found, and the UE-to-network relay #1 may be second found. UE-to-network relays found by the remote UE at different time and different places may be different and unpredictable. Therefore, a shared security parameter (for example, a shared key) cannot be preconfigured between the remote UE and the UE-to-network relay for secure communication between the remote UE and the UE-to-network relay.

According to the technical solutions provided in embodiments of this application, in this embodiment of this application, the key for inter-device communication is generated, so that a secure communication connection is dynamically established between user equipments. The key is essentially different from that in the foregoing conventional technology, and resolves the problem in the foregoing conventional technology.

Figure 9:
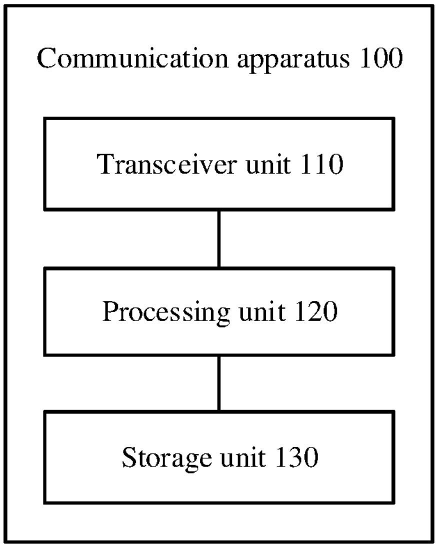
FIG. 9 is a schematic block diagram of an example of a communication apparatus according to an embodiment of this application.
Figure 10:
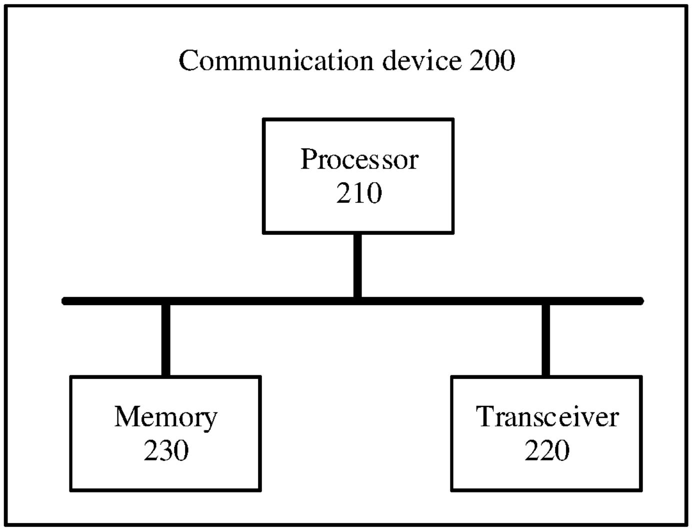
FIG. 10 is a schematic block diagram of another example of a communication device according to an embodiment of this application.

The methods provided in embodiments of this application are described above in detail with reference to FIG. 3A to FIG. 3C to FIG. 8A to FIG. 8B. With reference to FIG. 9 to FIG. 10, the following describes a communication apparatus provided in embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in embodiments of this application from a perspective of interaction between network elements. It may be understood that, to implement the foregoing functions, each network element includes a corresponding hardware structure and/or software module for executing the functions. A person skilled in the art should be able to be aware that, in combination with the examples described in embodiments disclosed in this specification, units and algorithm steps can be implemented by hardware or a combination of hardware and computer hardware in this application. Whether a function is executed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In embodiments of this application, a transmit end device or a receive end device may be divided into functional modules based on the foregoing method examples. For example, each functional module may be obtained through division based on each corresponding function, or two or more functions may be integrated in one processing module. The integrated module may be implemented in a form of hardware, or may be implemented in a form of a software functional module. It should be noted that, in embodiments of this application, module division is an example, and is merely logical function division. During actual implementation, another division manner may be used. An example in which each functional module is obtained through division based on each corresponding function is used below for description.

FIG. 9 is a schematic block diagram of a communication apparatus 100 according to an embodiment of this application. As shown in the figure, the communication apparatus 100 may include a transceiver unit 110 and a processing unit 120.

In a possible design, the communication apparatus 100 may be the remote user equipment in the foregoing method embodiments, or may be a chip configured to implement a function of the remote user equipment in the foregoing method embodiments.

It should be understood that the communication apparatus 100 may correspond to the remote user equipment in the method 400, the method 500, the method 600, the method 700, the method 800, and the method 900 according to embodiments of this application. The communication apparatus 100 may include units configured to perform the methods performed by the remote user equipment in the method 400 in FIG. 3A to FIG. 3C, the method 500 in FIG. 4A and FIG. 4B, the method 600 in FIG. 5A to FIG. 5D, the method 700 in FIG. 6, the method Boo in FIG. 7A to FIG. 7D, and the method 900 in FIG. 8A and FIG. 8B. In addition, the units in the communication apparatus 100 and the foregoing other operations and/or functions are separately intended to implement corresponding procedures of the method 400 in FIG. 3A to FIG. 3C, the method 500 in FIG. 4A and FIG. 4B, the method 600 in FIG. 5A to FIG. 5D, the method 700 in FIG. 6, the method 800 in FIG. 7A to FIG. 7D, and the method 900 in FIG. 8A and FIG. 8B. It should be understood that a specific process in which the units perform the foregoing corresponding steps is described in detail in the foregoing method embodiments. For brevity, details are not described herein again.

In another possible design, the communication apparatus 100 may be the authentication function network element in the foregoing method embodiments, or may be a chip configured to implement the authentication function network element in the foregoing method embodiments.

It should be understood that the communication apparatus 100 may correspond to the authentication function network element in the method 400 and the method 500 according to embodiments of this application. The communication apparatus 100 may include units configured to perform the methods performed by the authentication function network element in the method 400 in FIG. 3A to FIG. 3C and the method 500 in FIG. 4A and FIG. 4B. In addition, the units in the communication apparatus 100 and the foregoing other operations and/or functions are separately intended to implement corresponding procedures of the method 400 in FIG. 3A to FIG. 3C and the method 500 in FIG. 4A and FIG. 4B. It should be understood that a specific process in which the units perform the foregoing corresponding steps is described in detail in the foregoing method embodiments. For brevity, details are not described herein again.

In another possible design, the communication apparatus 100 may be the proximity-based services security function network element in the foregoing method embodiments, or may be a chip configured to implement a function of the proximity-based services security function network element in the foregoing method embodiments.

It should be understood that the communication apparatus 100 may correspond to the proximity-based services security function network element in the method 600, the method 700, the method 800, and the method 900 according to embodiments of this application. The communication apparatus 100 may include units configured to perform the methods performed by the proximity-based services security function network element in the method 600 in FIG. 5A to FIG. 5D, the method 700 in FIG. 6, the method 800 in FIG. 7A to FIG. 7D, and the method 900 in FIG. 8A and FIG. 8B. In addition, the units in the communication apparatus 100 and the foregoing other operations and/or functions are separately intended to implement corresponding procedures of the method 600 in FIG. 5A to FIG. 5D, the method 700 in FIG. 6, the method Boo in FIG. 7A to FIG. 7D, and the method 900 in FIG. 8A and FIG. 8B. It should be understood that a specific process in which the units perform the foregoing corresponding steps is described in detail in the foregoing method embodiments. For brevity, details are not described herein again.

Further, it should be understood that the transceiver unit in the communication apparatus 100 may correspond to a transceiver 210 in a communication device 200 shown in FIG. 10, and the processing unit 120 in the communication apparatus 100 may correspond to a transceiver 220 in the communication device 200 shown in FIG. 10.

Further, it should be understood that, when the communication apparatus 100 is a chip, the chip includes a transceiver unit and a processing unit. The transceiver unit may be an input/output circuit or a communication interface. The processing unit may be a processor, a microprocessor, or an integrated circuit that is integrated on the chip.

The transceiver unit no is configured to implement signal receiving and sending operations of the communication apparatus 100, and the processing unit 120 is configured to implement a signal processing operation of the communication apparatus 100.

Optionally, the communication apparatus 100 further includes a storage unit 130. The storage unit 130 is configured to store instructions.

FIG. 10 is a schematic block diagram of a communication device 200 according to an embodiment of this application.

As shown in the figure, the communication device 200 includes at least one processor 210 and a transceiver 220. The processor 210 is coupled to a memory, and is configured to execute instructions stored in the memory, to control the transceiver 220 to send a signal and/or receive a signal. Optionally, the communication device 200 further includes the memory 230, configured to store instructions.

It should be understood that the processor 210 and the memory 230 may be integrated into one processing apparatus. The processor 210 is configured to execute program code stored in the memory 230 to implement the foregoing functions. During specific implementation, the memory 230 may alternatively be integrated in the processor 210, or independent of the processor 210.

Further, it should be understood that the transceiver 220 may include a receiver (or referred to as a receive machine) and a transmitter (or referred to as a transmit machine). The transceiver may further include an antenna. There may be one or more antennas. The transceiver 220 may be a communication interface or an interface circuit.

In a possible design, the communication device 200 may be the remote user equipment in the foregoing method embodiments, or may be a chip configured to implement a function of the remote user equipment in the foregoing method embodiments.

Specifically, the communication device 200 may correspond to the remote user equipment in the method 400, the method 500, the method 600, the method 700, the method 800, and the method 900 according to embodiments of this application. The communication device 200 may include units configured to perform the methods performed by the remote user equipment in the method 400 in FIG. 3A to FIG. 3C, the method 500 in FIG. 4A and FIG. 4B, the method boo in FIG. 5A to FIG. 5D, the method 700 in FIG. 6, the method Boo in FIG. 7A to FIG. 7D, and the method 900 in FIG. 8A and FIG. 8B. In addition, the units in the communication device 200 and the foregoing other operations and/or functions are separately intended to implement corresponding procedures of the method 400 in FIG. 3A to FIG. 3C, the method 500 in FIG. 4A and FIG. 4B, the method 600 in FIG. 5A to FIG. 5D, the method 700 in FIG. 6, the method 800 in FIG. 7A to FIG. 7D, and the method 900 in FIG. 8A and FIG. 8B. It should be understood that a specific process in which the units perform the foregoing corresponding steps is described in detail in the foregoing method embodiments. For brevity, details are not described herein again.

In a possible design, the communication device 200 may be the proximity-based services security function network element in the foregoing method embodiments, or may be a chip configured to implement a function of the proximity-based services security function network element in the foregoing method embodiments.

Specifically, the communication device 200 may correspond to the proximity-based services security function network element in the method 400 and the method 500 according to embodiments of this application. The communication device 200 may include units configured to perform the methods performed by the proximity-based services security function network element in the method 400 in FIG. 3A to FIG. 3C and the method 500 in FIG. 4A and FIG. 4B. In addition, the units in the communication device 200 and the foregoing other operations and/or functions are separately intended to implement corresponding procedures of the method 400 in FIG. 3A to FIG. 3C and the method 500 in FIG. 4A and FIG. 4B. It should be understood that a specific process in which the units perform the foregoing corresponding steps is described in detail in the foregoing method embodiments. For brevity, details are not described herein again.

In a possible design, the communication device 200 may be the authentication function network element in the foregoing method embodiments, or may be a chip configured to implement a function of the authentication function network element in the foregoing method embodiments.

Specifically, the communication device 200 may correspond to the authentication function network element in the method 600, the method 700, the method 800, and the method 900 according to embodiments of this application. The communication device 200 may include units configured to perform the methods performed by the authentication function network element in the method 600 in FIG. 5A to FIG. 5D, the method 700 in FIG. 6, the method 800 in FIG. 7A to FIG. 7D, and the method 900 in FIG. 8A and FIG. 8B. In addition, the units in the communication device 200 and the foregoing other operations and/or functions are separately intended to implement corresponding procedures of the method 600 in FIG. 5A to FIG. 5D, the method 700 in FIG. 6, the method Boo in FIG. 7A to FIG. 7D, and the method 900 in FIG. 8A and FIG. 8B. It should be understood that a specific process in which the units perform the foregoing corresponding steps is described in detail in the foregoing method embodiments. For brevity, details are not described herein again.

When the communication device 200 is a chip, the chip includes a transceiver unit and a processing unit. The transceiver unit may be an input/output circuit or a communication interface. The processing unit may be a processor, a microprocessor, or an integrated circuit that is integrated on the chip. An embodiment of this application further provides a processing apparatus, including a processor and an interface. The processor may be configured to perform the methods in the foregoing method embodiments. It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processor (DSP) circuit, a micro controller unit (MCU), a programmable controller (PLD), or another integrated chip.

In an implementation process, the steps in the foregoing methods may be implemented by using an integrated logic circuit of hardware in the processor, or by using instructions in a form of software. The steps in the methods disclosed with reference to embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in a memory. The processor reads information in the memory, and completes the steps in the foregoing methods in combination with hardware in the processor. To avoid repetition, details are not described herein again.

It should be noted that the processor in this embodiment of this application may be an integrated circuit chip, and has a signal processing capability. In an implementation process, the steps in the foregoing method embodiments may be implemented by using an integrated logic circuit of hardware in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in a memory. The processor reads information in the memory, and completes the steps in the foregoing methods in combination with hardware in the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct ram-bus RAM, DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform the method in any embodiment shown in FIG. 3A to FIG. 3C, FIG. 4A and FIG. 4B, or FIG. 5A to FIG. 5D.

According to the methods provided in embodiments of this application, this application further provides a computer-readable medium. The computer-readable medium stores program code. When the program code is run on a computer, the computer is enabled to perform the method in any embodiment shown in FIG. 3A to FIG. 3C, FIG. 4A and FIG. 4B, or FIG. 5A to FIG. 5D.

According to the methods provided in embodiments of this application, this application further provides a system. The system includes the foregoing apparatus or device.

All or some of the foregoing embodiments may be implemented by using software, hardware, firmware, or any combination thereof. When software is used to implement the embodiments, all or some of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

The network side device and the terminal device in the foregoing apparatus embodiments correspond to the network side device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification are used to indicate computer-related entities, hardware, firmware, a combination of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within the process and/or the execution thread, and a component may be located on one computer and/or distributed between two or more computers. In addition, these components may be executed from various computer-readable media that store various data structures. For example, the components may perform communication by using a local process and/or a remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with examples described in embodiments disclosed in this specification, units and algorithm steps may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiments are merely examples. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit.

When the function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

generating, by a first communication apparatus a first temporary identifier based on a first key generated in an authentication procedure, a network identifier of a remote UE, and routing information, wherein the network identifier of the remote UE is used by a network side to identify information about the remote UE, and wherein the routing information is routing information used to determine a core network element related to the remote UE, wherein the first communication apparatus is the remote UE or a chip of the remote UE;

sending, by the first communication apparatus, a first request to a UE-to-Network Relay, wherein the first request requests to establish a communication connection between the remote UE and the UE-to-Network Relay second communication apparatus, and the first request comprises the first temporary identifier and a relay service code; and generating, by the first communication apparatus, a shared key based on the first key generated in the authentication procedure and the relay service code, wherein the shared key is associated with protecting the communication connection between the remote UE and the UE-to-Network Relay.

2. The method according to claim 1, wherein the first key is a key Kausf.

3. The method according to claim 1, wherein generating, by the first communication apparatus, the first temporary identifier based on the first key, the network identifier of the remote UE, and the routing information comprises:

obtaining, by the first communication apparatus, a second temporary identifier based on the first key and the network identifier of the remote UE, wherein obtaining the second temporary identifier comprises using the first key and the network identifier of the remote UE as input parameters of a first preset algorithm; and splicing the second temporary identifier and the routing information to obtain the first temporary identifier.

4. The method according to claim 1, wherein the network identifier of the remote UE is a subscription permanent identifier (SUPI), an international mobile subscriber identity (IMSI), or a generic public subscription identifier (GPSI); and the routing information is a routing indicator.

5. A method, comprising:

generating, by a first network element, a first temporary identifier based on a first key generated in an authentication procedure, a network identifier of a remote user equipment (UE), and routing information, wherein the network identifier of the remote UE is used by a network side to identify information about the remote UE, and wherein the routing information is routing information used to determine a core network element related to the remote UE;

receiving, by the first network element, a key obtaining message from a second network element, wherein the key obtaining message comprises an identifier of the remote UE and a relay service code, and the identifier of the remote UE comprises the first temporary identifier or the network identifier of the remote UE; and generating, by the first network element, a shared key based on the identifier of the remote UE, the relay service code, and the first key, wherein the shared key is associated with protecting a communication connection between the remote UE and a UE-to-Network Relay, and the first key is generated by the first network element in the authentication procedure of the remote UE; and sending, by the first network element, the shared key to the second network element.

6. The method according to claim 5, wherein generating, by the first network element, the shared key based on the identifier of the remote UE, the relay service code, and the first key comprises:

obtaining, by the first network element, the first key based on the identifier of the remote UE, and generating, by the first network element, the shared key based on the first key and the relay service code.

7. The method according to claim 5, wherein the first key is a key Kausf.

8. The method according to claim 5, wherein generating, by the first network element, the first temporary identifier based on the first key, the network identifier of the remote UE, and the routing information comprises:

obtaining, by the first network element, a second temporary identifier based on the first key and the network identifier of the remote UE, wherein obtaining the second temporary identifier comprises using the first key and the network identifier of the remote UE as input parameters of a first preset algorithm; and splicing the second temporary identifier and the routing information to obtain the first temporary identifier.

9. The method according to claim 5, wherein:

the network identifier of the remote UE is a subscription permanent identifier (SUPI), an international mobile subscriber identity (IMSI), or a generic public subscription identifier (GPSI); and the routing information is a routing indicator.

10. The method according to claim 5, wherein the first network element is an authentication function network element.

11. The method according to claim 5, wherein the second network element is a mobility management network element, an authentication function network element, or a proximity-based services security function network element.

12. A first communication apparatus, comprising:

at least one processor; and at least one non-transitory memory, coupled to the at least one processor, the at least one memory storing instructions for execution by the at least one processor, wherein the at least one processor, the at least one non-transitory memory and the instructions are configured to cause the first communication apparatus to:

generate a first temporary identifier based on a first key generated in an authentication procedure, a network identifier of a remote UE, and routing information, wherein the network identifier of the remote UE is used by a network side to identify information about the remote UE, and wherein the routing information is routing information used to determine a core network element related to the remote UE, wherein the first communication apparatus is the remote UE or a chip of the remote UE;

send a first request to a UE-to-Network Relay, wherein the first request requests to establish a communication connection between the remote UE and the UE-to-Network Relay, and the first request comprises the first temporary identifier and a relay service code; and generate a shared key based on the first key and the relay service code, wherein the shared key is associated with protecting the communication connection between the remote UE and the UE-to-Network Relay.

13. The first communication apparatus according to claim 12, wherein the first key is a key Kausf.

14. The method according to claim 5, further comprising:

receiving, by the first network element, indication information from a third network element in the authentication procedure of the remote UE; and generating, by the first network element, the first temporary identifier based on the first key in response to the indication information.

15. The first communication apparatus according to claim 12, wherein the at least one processor is configured to execute the instructions to cause the first communication apparatus to:

obtain a second temporary identifier based on the first key and the network identifier of the remote UE, wherein obtaining the second temporary identifier comprises using the first key and the network identifier of the remote UE as input parameters of a first preset algorithm; and splicing the second temporary identifier and the routing information to obtain the first temporary identifier.

16. The first communication apparatus according to claim 12, wherein the network identifier of the remote UE is a subscription permanent identifier (SUPI), an international mobile subscriber identity (IMSI), or a generic public subscription identifier (GPSI); and the routing information is a routing indicator.

17. The first communication apparatus according to claim 12, wherein the at least one processor is configured to execute the instructions to cause the first communication apparatus further to:

send a non-access stratum (NAS) message to a mobility management network element, wherein the NAS message comprises capability information, and the capability information indicates that the remote UE supports acting as a remote communication apparatus.

18. An apparatus, comprising:

at least one processor; and at least one non-transitory memory coupled to the at least one processor and storing instructions for execution by the at least one processor, wherein the at least one processor, the at least one non-transitory memory and the instructions are configured to execute the instructions to cause the apparatus to:

generate a first temporary identifier based on a first key, comprising:

generating the first temporary identifier based on the first key, a network identifier of a remote UE, and routing information, wherein the network identifier of the remote UE is used by a network side to identify information about the remote UE, and wherein the routing information is routing information used to determine a core network element related to the remote UE;

receive a key obtaining message from a second network element, wherein the key obtaining message comprises an identifier of the remote UE and a relay service code, and the identifier of the remote UE comprises the first temporary identifier or the network identifier of the remote UE;

generate a shared key based on the identifier of the remote UE, the relay service code, and the first key, wherein the shared key is used to protect a communication connection between the remote UE and a UE-to-Network Relay, and the first key is generated in an authentication procedure of the remote UE; and send the shared key to the second network element.

19. The apparatus according to claim 18, wherein generating the shared key based on the identifier of the remote UE, the relay service code, and the first key comprises:

obtaining the first key based on the identifier of the remote UE, and generating the shared key based on the first key and the relay service code.

20. The method of claim 1, wherein the routing information is routing information for a unified data management (UDM) network element related to the remote UE and connected to the remote UE by the UE-to-Network Relay, which acts as a relay between the remote UE and the UDM network element;

wherein the method further comprises:

deriving, by the first communication apparatus, at least one of an intermediate key or a session key based on the shared key; and deriving, by the first communication apparatus, based on the at least one of the intermediate key or the session key, at least one of an encryption key or an integrity protection key on each of a signaling plane and a user plane between the remote UE and the UE-to-Network Relay.

* * * * *